United States Patent
Sacripante et al.

(10) Patent No.: US 9,328,260 B2
(45) Date of Patent: *May 3, 2016

(54) POLYESTER PROCESSES

(71) Applicant: Xerox Corporation, Norwalk, CT (US)

(72) Inventors: Guerino G. Sacripante, Oakville (CA); Ke Zhou, Oakville (CA); Rosa M. Duque, Brampton (CA); Sonja Hadzidedic, Oakville (CA); Biritawit Asfaw, Oakville (CA)

(73) Assignee: Xerox Corporation, Norwalk, CT (US)

( * ) Notice: Subject to any disclaimer, the term of this patent is extended or adjusted under 35 U.S.C. 154(b) by 50 days.

This patent is subject to a terminal disclaimer.

(21) Appl. No.: 14/155,945

(22) Filed: Jan. 15, 2014

(65) Prior Publication Data

US 2015/0197668 A1 Jul. 16, 2015

(51) Int. Cl.
*C08G 63/64* (2006.01)
*C08G 63/553* (2006.01)
*C09F 1/04* (2006.01)

(52) U.S. Cl.
CPC ............... *C09F 1/04* (2013.01); *C08G 63/553* (2013.01); *C08G 63/64* (2013.01)

(58) Field of Classification Search
None
See application file for complete search history.

(56) References Cited

U.S. PATENT DOCUMENTS

| | | | |
|---|---|---|---|
| 4,101,529 A * | 7/1978 | Ammons | 528/67 |
| 5,278,020 A * | 1/1994 | Grushkin et al. | 430/109.3 |
| 5,308,734 A * | 5/1994 | Sacripante et al. | 430/137.14 |
| 5,344,738 A * | 9/1994 | Kmiecik-Lawrynowicz et al. | 430/137.14 |
| 5,370,963 A | 12/1994 | Patel et al. | |
| 5,418,108 A | 5/1995 | Kmiecik-Lawrynowicz et al. | |
| 5,959,066 A * | 9/1999 | Charbonneau et al. | 528/271 |
| 6,025,061 A * | 2/2000 | Khanarian et al. | 428/221 |
| 6,063,464 A * | 5/2000 | Charbonneau et al. | 428/36.92 |
| 6,107,447 A * | 8/2000 | Kreuder et al. | 528/310 |
| 6,120,967 A | 9/2000 | Hopper et al. | |
| 6,130,021 A | 10/2000 | Patel et al. | |
| 6,180,747 B1 * | 1/2001 | Sacripante et al. | 528/193 |
| 6,593,049 B1 * | 7/2003 | Veregin et al. | 430/108.1 |
| 6,628,102 B2 | 9/2003 | Batson | |
| 6,743,559 B2 * | 6/2004 | Combes et al. | 430/123.56 |
| 6,756,176 B2 * | 6/2004 | Stegamat et al. | 430/137.14 |
| 8,187,780 B2 | 5/2012 | Mcaneney-Lannen et al. | |
| 8,574,803 B2 * | 11/2013 | Sacripante et al. | 430/109.4 |
| 2003/0050424 A1 * | 3/2003 | Bernard | 528/49 |
| 2005/0250927 A1 * | 11/2005 | Pritschins et al. | 528/44 |
| 2007/0213517 A1 * | 9/2007 | Ueno et al. | 536/18.2 |
| 2008/0107989 A1 * | 5/2008 | Sacripante et al. | 430/109.4 |
| 2008/0107990 A1 * | 5/2008 | Field et al. | 430/109.4 |
| 2008/0236446 A1 * | 10/2008 | Zhou et al. | 106/31.25 |
| 2010/0203439 A1 * | 8/2010 | Zhou et al. | 430/108.6 |
| 2010/0230439 A1 * | 9/2010 | Wootton | 222/145.5 |
| 2011/0315591 A1 * | 12/2011 | Lespinasse et al. | 206/524.3 |
| 2012/0264041 A1 * | 10/2012 | Yamasaki et al. | 430/105 |
| 2012/0276477 A1 * | 11/2012 | Wosnick et al. | 430/109.4 |
| 2013/0164668 A1 * | 6/2013 | Sacripante et al. | 430/108.1 |

* cited by examiner

*Primary Examiner* — Peter A Salamon
(74) *Attorney, Agent, or Firm* — Eugene O. Palazzo

(57) ABSTRACT

Disclosed are processes for the preparation of rosin diols accomplished by the reaction of a rosin acid with a glycerine carbonate in the presence of a catalyst, and subsequently where the rosin diol can be reacted with a diacid to generate an amorphous polyester resin.

20 Claims, No Drawings

POLYESTER PROCESSES

REFERENCE TO RELATED PATENT

Reference is made to U.S. Pat. No. 8,574,803 issued on Nov. 5, 2013 and the corresponding U.S. Application published as 2013/0164668 on Jun. 27, 2013.

The present disclosure is generally directed to toner compositions comprised of bio-based or biodegradable amorphous polyester resins prepared from the reaction of a rosin diol, a rosin-monoglycerate, a bis-rosin glycerate, or mixtures thereof, a diacid, an optional organic diol and an optional condensation catalyst and where the rosin diol is generated by the reaction of a rosin acid and a glycerine carbonate; and crystalline polyester resins and processes thereof,

BACKGROUND

The environmental issues relating to the use of toxic chemicals has been well documented, especially as these chemicals adversely affect human beings, animals, trees, plants, fish, and other resources. Also, it is known that toxic chemicals usually cannot be safely recycled, are costly to prepare, cause the pollution of the world's water, add to the carbon footprint, and reduce the oil and coal reserves. Thus, there has been an emphasis on the development of green materials such as bio-based polymers that are biodegradable, and that minimize the economic impacts and uncertainty associated with the reliance on petroleum imported from unstable regions.

Biodegradable (bio) polymers have been referred to as a group of materials that respond to the action of enzymes, and that chemically degrade by the interaction with living organisms. Biodegradation may also occur through chemical reactions that are initiated by photochemical processes, oxidation and hydrolysis that result from the action of environmental factors. Also, biodegradable polymers include a number of synthetic polymers that possess chemical functionalities present in naturally occurring compounds. However, several of these polymers can be costly to prepare, may not fully be biodegradable, and may decompose resulting in emitting carbon to the environment.

Bio or biodegradable matter has also been referred to as organic materials, such as plant and animal matter and other substances originating from living organisms, or artificial materials like the bio-based amorphous polyesters disclosed herein, and that are subject to nontoxic degradation by microorganisms.

Therefore, there is a need for bio based resins and processes thereof that minimize or substantially eliminate the disadvantages illustrated herein.

Also, there is a need for polymers and toners thereof derived from sources other than petroleum and bisphenol A.

Further, there is a need for economical processes for the preparation of bio-based resins that can be selected for incorporation into toner compositions used to develop xerographic images.

Another need relates to toner compositions, inclusive of low melting toners, prepared by emulsion aggregation processes, and where the resins or polymers selected are environmentally acceptable and are free of bisphenol A components.

Moreover, there is a need for xerographic systems and solid ink jet systems that utilize for development bio-based toners, such as bio-based rosin diol polyester toners that are obtainable in high yields, exceeding for example 90 percent, possess consistent small particle sizes of, for example, from about 1 to about 15 microns in average diameter, are of a suitable energy saving shape, have a narrow particle size GSD, and that include various core shell structures.

Yet another need resides in processes for the preparation of bio-based amorphous polyester toner resins that avoid the use of toxic materials like certain costly epoxides.

There is also a need for bio-based amorphous polyesters that are capable of being converted to innocuous products by the action of suitable living organisms such as microorganisms.

These and other needs and advantages are achievable in embodiments with the processes and compositions disclosed herein.

SUMMARY

Disclosed is a process comprising the reaction of a rosin acid with a glycerine carbonate in the presence of a catalyst.

Also disclosed is a process for the preparation of a bio-based amorphous polyester resin which comprises the reaction of a rosin diol, a bio-based glycerine carbonate, a dicarboxylic acid and an optional organic diol.

Moreover there is disclosed herein a process for the preparation of a bio-based amorphous polyester comprising the reaction of a rosin acid with a bio-based glycerine carbonate, followed by the reaction of the resulting rosin diol with a dicarboxylic acid and an optional organic diol and wherein the bio content of the bio-based amorphous polyester is for example, from about 45 to about 75 percent by weight of the bio-based amorphous polyester resin.

EMBODIMENTS

There is disclosed herein toner compositions that comprise resins or a mixture of resins, obtained from the reaction of rosin diols, diacids, and optionally organic diols, and wherein the rosin diols are generated from the reaction of rosin acids and a glycerine carbonates in the presence of an optional catalyst.

Additionally, disclosed herein are economical processes for the preparation of rosin diols from rosin acids, glycerine carbonate, and an optional catalyst, and where the rosin diols are reacted with a suitable component, such as a dicarboxylic acid or a mixture of dicarboxylic acids, and optionally an organic diol, to form biodegradable containing amorphous polyesters, and where the rosin diol moiety is present in an amount of, for example, from about 30 to about 55 mole percent, from about 30 to about 50 mole percent, from about 30 to about 51 mole percent, and more specifically, from about 40 to about 50 percent by weight of solids.

The present disclosure also relates to the emulsion aggregation generation of toner compositions that include biodegradable containing amorphous polyester resins prepared in accordance with the processes illustrated herein, and where the bio-based resins are derived from a bio-based rosin acid monomers and bio-based glycerine carbonates.

Yet more specifically, disclosed herein is a bio-degradable amorphous polyester resin comprising the polycondensation product of (a) at least one organic diacid, an organic acid ester, or an organic acid diester; (b) at least one rosin diol, and (c) optionally an organic diol and toner compositions thereof, inclusive of those toner compositions prepared by emulsion aggregation coalescence processes.

Rosin Acids

Rosin is generally derived from conifers and other plants, and comprises mixtures of organic acids, such as abietic acid and related compounds and isomers thereof, including for example, neoabietic acid, palustric acid, pimaric acid, levopimaric acid, isopimaric acid, dehydroabietic acid, or dihydroabietic acid, aracopimaric acid, and the like.

Examples of rosin acids selected for the processes illustrated herein are represented by the following formulas/structures

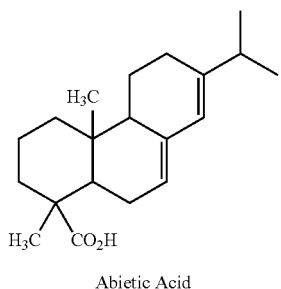

Abietic Acid

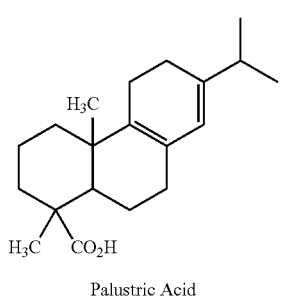

Palustric Acid

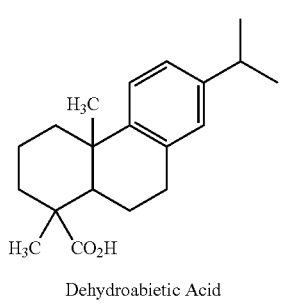

Dehydroabietic Acid

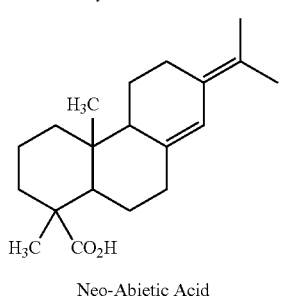

Neo-Abietic Acid

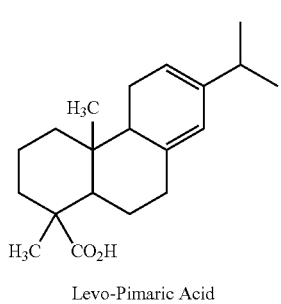

Levo-Pimaric Acid

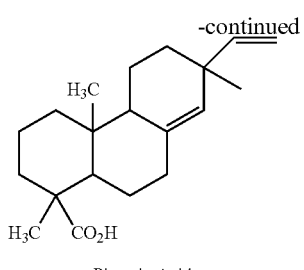

Pimaric Acid

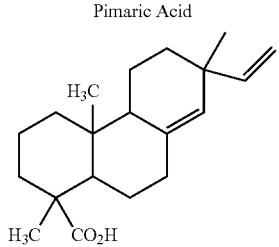

Sandaracopimaric Acid

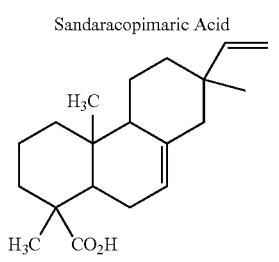

Iso-Pimaric Acid and mixtures thereof.

The rosin acids known as Gum Rosins are harvested, for example, from the periodic wounding of the gum tree and collecting the sap, followed by extraction processes and purification. The abietic acid and dedydroabietic acid content of a number of rosin acids is typically in excess of about 70 percent by weight of the mixture, such as for example, from about 75 to about 95, or from about 80 to about 90 percent by weight based on the total solids.

Other specific known sources of rosin acids are wood rosins, which are obtained by harvesting pine tree stumps after they have remained in the ground for about 10 years, so that the bark and sapwood decay, and extrude the resinous material extract thus resulting in the rosin acids with similar formulas/structures as those illustrated herein, and where the various proportions of the individual acids may vary. For example, the major components of abietic acid and dedydroabietic amounts in the wood rosins are typically in excess of about 50 percent by weight, such as from about 55 to about 95 or from about 70 to about 90 percent by weight of the mixture solids. The amount of abietic acid present in the wood rosin acids mixture can be controlled by known purification methods, such as distillation, and where the amount subsequent to purification of this acid is believed to be from about 70 to about 80 percent by weight of the rosin acid mixture. Similarly, the amount of dedydroabietic acid can vary including when this acid is subjected to purification by known distillation methods, and which amount is, for example, believed to be from about 65 to about 85 percent by weight.

The disclosed rosin acid mixtures can also be converted to a dehydroabietic acid content, such as from about 70 to about 85 percent by weight, by the dehydrogenation reaction of the mixture with a catalyst, such as a paladium activated carbon catalyst, to form disproportionated rosin acids, wherein the abietic acid content and other rosin acids are converted to the aromatic dehydroabietic acids, and where the dehydroabietic acid amount is from about 40 to about 90 percent by weight of the rosin acid mixture solids.

Additionally, rosin acid mixtures can be converted to hydrogenated rosin acids such that the conjugated unsaturation of abietic rosin acids and other rosin acid components can be removed through catalytic hydrogenation to overcome or minimize the shortcomings of oxidation and color degradation in the resulting rosin acids.

Examples of hydrogenated rosin acids, such as dihydroabietic acids or dehydroabietic acids, and tetrahydroabietic acid, are represented by the following formulas/structures and mixtures thereof.

Sources of known rosin acids are Tall Oil Rosins, obtained by distillation of the byproduct of the known Kraft sulfate pulping process; rosin acid mixtures resulting from the pulping processes have a tendency to crystallize and usually contain from about 200 to about 600 parts per million (ppm) sulfur; distilled Tall Oil Rosins resulting in rosin acids and esters thereof which can be reacted with diacids as illustrated herein, which oil rosins are cost competitive with gum rosin and wood rosin derivatives.

Rosin acids and mixtures thereof can be obtained from various sources, including Sigma-Aldrich, TCI America as abietic acid, Arakawa chemicals as Rosin KR-608™ or disproportionate KR-614™, where the dehydroabietic acid content is reported as being greater than about 80 percent by weight of total solids; rosin acids available from Pinova Inc., Eastman Chemicals, Hexion Chemicals, and Resinall Corporation, such as Resinall Rosin R807™; and hydrogenated rosin acid mixtures, such as Floral AX™, available from Pinova Incorporated.

In one aspect of the present disclosure, rosin acids are converted into difunctional monomers, such as rosin monoglycerates or rosin diols, by reacting the rosin acid, such as abietic acid, with a glycerine carbonate and a catalyst, such as triethyl ammonium iodide, resulting in an abietic monoglycerate or an abietic diol, as illustrated with reference to the following reaction scheme

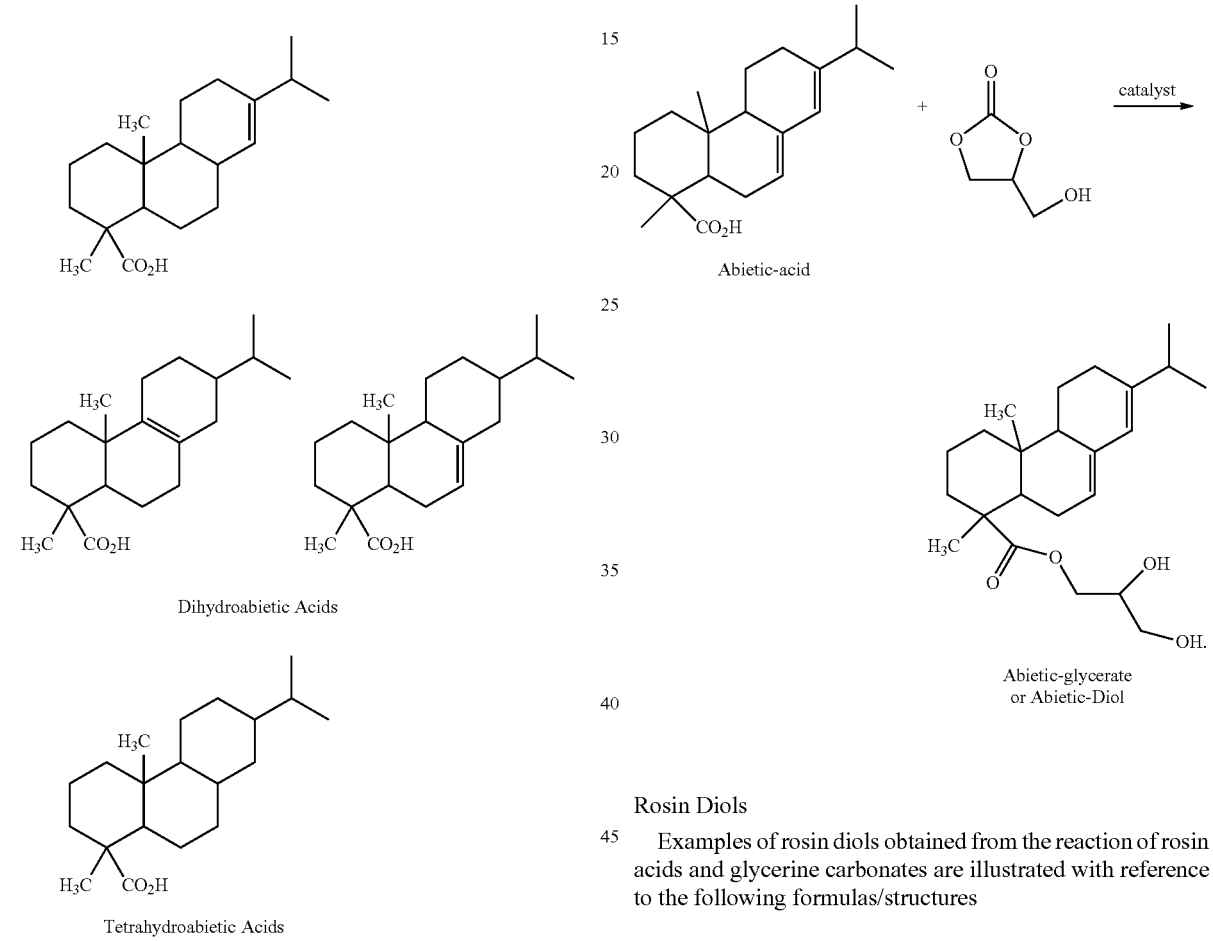

Rosin Diols

Examples of rosin diols obtained from the reaction of rosin acids and glycerine carbonates are illustrated with reference to the following formulas/structures -continued

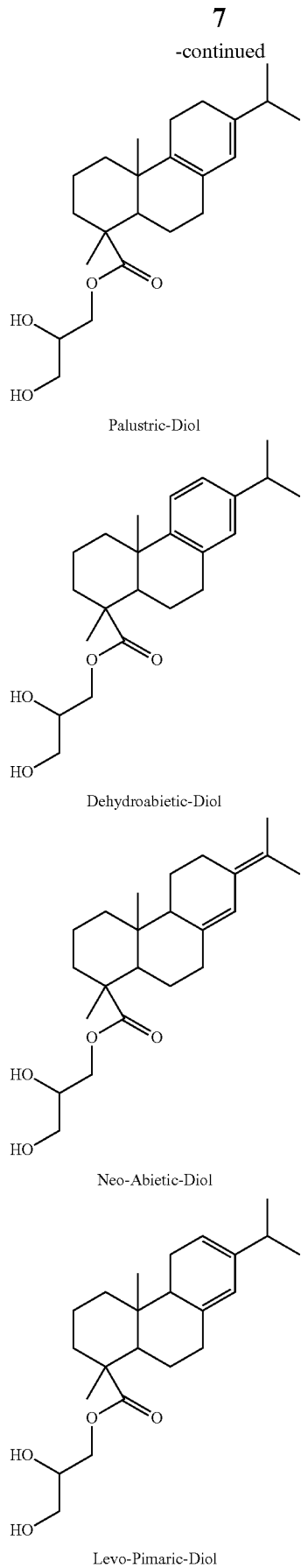

Palustric-Diol

Dehydroabietic-Diol

Neo-Abietic-Diol

Levo-Pimaric-Diol

-continued

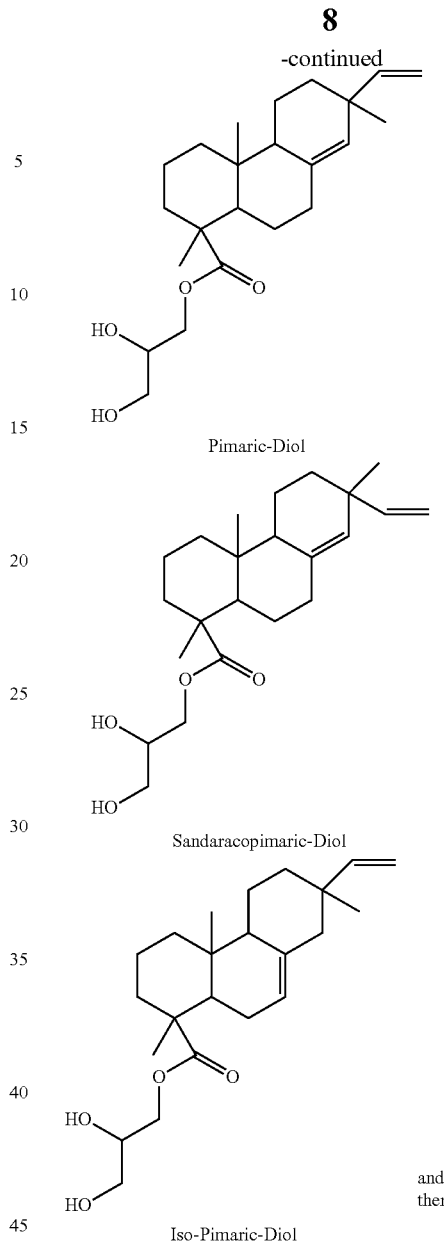

Pimaric-Diol

Sandaracopimaric-Diol

Iso-Pimaric-Diol and optionally mixtures thereof.

The rosin diol products resulting from the reaction of rosin acids and glycerine carbonates can be monitored during the reaction by known methods, such as by the measurement of the acid values thereof. For example, the initial rosin acid or rosin acid mixture selected can have an acid value of about 135 to about 180 milligrams KOH/gram. During the reaction, the rosin acid is consumed and the acid value is reduced, thereby increasing the yield of product, to an acid value of less than about 2 milligrams KOH/gram of rosin (>99 percent yield), or about 0 milligram KOH/gram (100 percent yield). The rosin dial product can be identified by both proton and carbon-13 Nuclear Magnetic Resonance as well as mass spectroscopy.

Examples of the glycerine carbonates, selected for the reaction with the rosin acids, are available from Huntsman Corporation as JEFFSOL® glycerine carbonates also identified by Huntsman Corporation as glycerine carbonate, glycerol carbonate, glyceryl carbonate, and 4-hydroxymethyl-1, 3-dioxolan-2-one.

Examples of suitable polycondensation catalysts utilized for the preparation of the crystalline polyesters or the bio-based amorphous polyesters disclosed herein include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, zinc acetate, titanium isopropoxide, or mixtures thereof; and which catalysts are selected in amounts of, for example, from about 0.01 mole percent to about 5 mole percent, from about 0.1 to about 0.8 mole percent, from about 0.2 to about 0.6 mole percent, or more specifically, about 0.2 mole percent, based on the starting diacid or diester used to generate the polyester resins.

In embodiments of the present disclosure, catalysts selected in the amounts illustrated herein include organo amines, such as ethyl amine, butyl amine, propyl amine, aryl amines, such as imidazole, 2-methyl imidazole, pyridine, dimethylamino pyridine, organo ammonium halides such as trimethyl ammonium chloride, triethyl ammonium chloride, tributyl ammonium chloride, trimethyl ammonium bromide, triethyl ammonium bromide, tributyl ammonium bromide, trimethyl ammonium iodide, triethyl ammonium iodide, tributyl ammonium iodide, tetraethyl ammonium chloride, tetraethyl ammonium bromide, tetraethyl ammonium iodide, tetrabutyl ammonium chloride, tetrabutyl ammonium bromide, tetrabutyl ammonium iodide, organo phosphines such as triphenylphosphine, organo phosphonium halides, tetraethyl phosphonium chloride, tetraethyl phosphonium bromide, tetraethyl phosphonium iodide, tetrabutyl phosphonium chloride, tetrabutyl phosphonium bromide, tetrabutyl phosphonium iodide, and the like.

Processes

The process of the present disclosure comprises the reaction of a rosin acid, inclusive of known rosin acids as illustrated herein, with non-toxic economical bio-based glycerine carbonates, commercially available from Huntsman Corporation, and which reaction is accomplished in the presence of an optional catalyst.

In the processes disclosed herein, there is prepared a rosin diol by the reaction of the components of a rosin acid, a bio-based glycerin carbonate, and an optional catalyst, which components are heated at various temperatures, such as for example, from about 110° C. to about 190° C., from about 120° C. to about 185° C., from about 120° C. to about 160° C., and in embodiments up to about 200° C., for a period of time of, for example, from about 1 hour to about 10 hours, or from about 1 hour to about 7 hours, such that the resulting product has an acid value of equal to or less than about 4 like equal to or less than 2 milligrams KOH/gram (>99 percent yield), like from about 0.1 to about 1, from 1 to about 1.9, from about 1 to about 1.5 milligrams KOH/gram from or an acid value of 0 milligram KOH/gram (100 percent yield).

Processes for the preparation of rosin diols can be accomplished by charging a reaction vessel with from about 0.95 to about 1.05 mole equivalent of rosin acid, from about 1.10 to 2.2 mole equivalents of glycerine carbonate, and from about 0.001 to about 0.01 mole equivalent of a catalyst, such as tetraethyl or tetrabutyl ammonium iodide. The resulting mixture is then heated with stirring to a temperature of from about 120° C. to about 185° C. for a period of from about 1 hour to about 7 hours. The reaction is monitored until the acid value of the reaction mixture is less than about 4 milligrams KOH/grams, such as from about 3.5 to about zero. Although a slight excess of from about 0.05 to about 0.15 mole equivalent of glycerine carbonate can be selected for the reaction, a larger excess of from about 0.16 to about 2 mole equivalents of glycerine carbonate can be utilized. The excess glycerin carbonate can serve as a branching agent during the polymerization with the diacid to produce the amorphous bio-based polyester resin.

However, in some instances, a minor amount of a product, such as a bis-rosin glycerate, forms from the reactions disclosed herein, especially in some instances when basic catalysts are utilized. For example, when there is selected a catalyst of 2-methyl imidazole or dimethyl amino pyridine, a bis-rosin glycerate, represented by the following alternative formulas/structures results as the major product

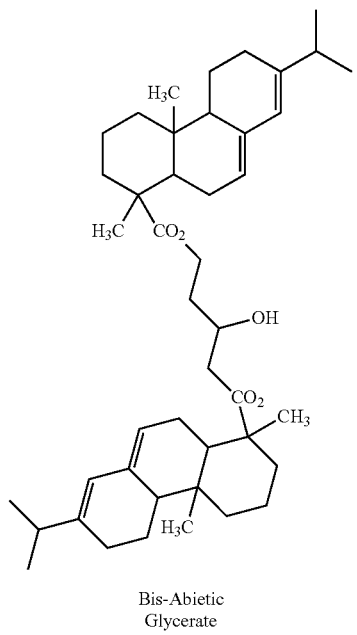

Bis-Abietic Glycerate

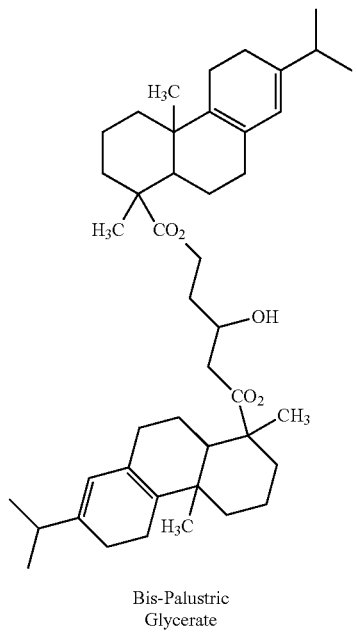

Bis-Palustric Glycerate

-continued
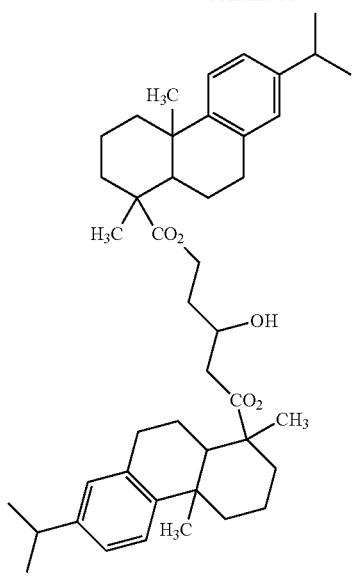
Bis-Dihydroabietic Glycerate
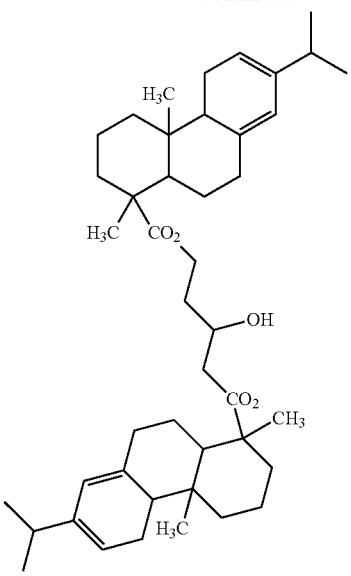
Bis-LevoPimaric Glycerate
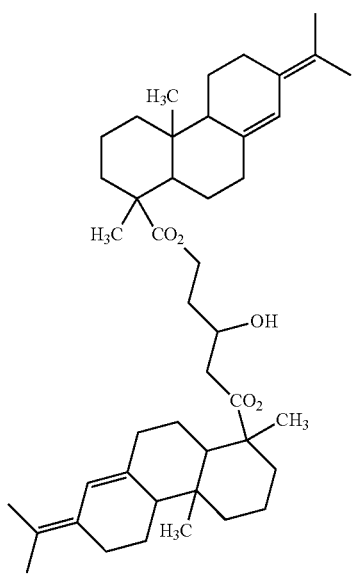
Bis-NeoAbietic Glycerate
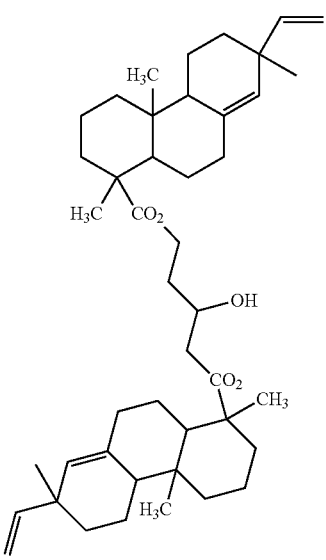
Bis-Pimaric Glycerate

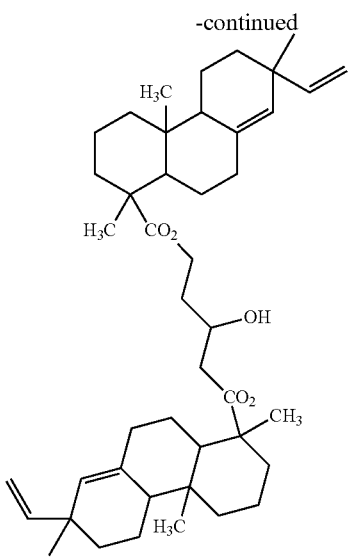

Bis-Sandaracopimaric
Glycerate

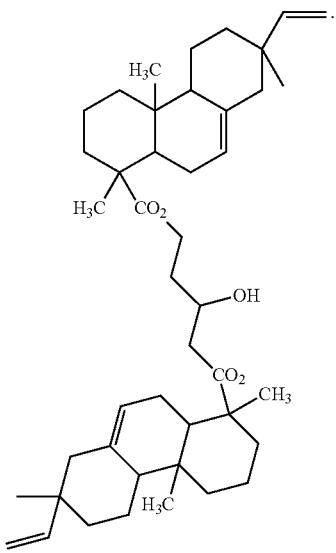

Bis-IsoPimaric
Glycerate

The formation of the disclosed bis-rosin glycerate is not necessarily avoided as it can also polymerize through transesterification reactions with a diacid and a diol in the presence of a polycondensation catalyst at temperatures of from about 220° C. to about 260° C., to result in the bio-based amorphous polyester resin. Furthermore, when an excess amount of glycerine carbonate is selected, it can subsequently react with the diacid/diol to form the bio-based amorphous polyester, and where the excess glycerol and/or glycerine content are a source of branching.

Subsequently, the prepared rosin diols are reacted with a suitable acid, such as a diacid like a dicarboxylic acid, or a mixture of dicarboxylic acids and an optional organic diol, to generate the desired bio-based amorphous polyester resins. The bio-based amorphous polyester resins generated from glycerine carbonate monomers, which monomers are considered bio-based because they are derived from natural sources of, for example, rosins obtained from tree sap and glycerine obtained mostly from vegetable oils and suitable petrochemicals such as those derived from isophthalic acid, terephthalic acid, and the like.

In embodiments, the amorphous bio-based polyester resin may be derived from a bio-based material selected from the group consisting of polylactide, polycaprolactone, polyesters derived from D-Isosorbide, polyesters derived from a fatty dimer diol, polyesters derived from a dimer diacid, L-tyrosine, glutamic acid, and combinations thereof. Examples of amorphous bio-based polymeric resins which may be utilized include polyesters derived from monomers including a fatty dimer acid or diol of soya oil, D-Isosorbide, and/or amino acids such as L-tyrosine and glutamic acid.

Rosin Diols

The rosin diols resulting in accordance with the processes disclosed herein are reacted with a number of known diacids, such as dicarboxylic acids, as represented by the following formulas/structures $$HOOC-(CH_2)_n-COON$$

where n represents the number of groups of from about 1 to about 25, from about 1 to about 15, from about 1 to about 10, from about 1 to about 5, or 1; or $$HOOC-R-COOH$$

where R is alkyl, alkenyl, alkynyl, or aryl.

Specific examples of dicarboxylic acids that can be reacted with the rosin diols and optionally organic diols are acetonedicarboxylic acid, acetylenedicarboxylic acid, adipic acid, acetonedicarboxylic acid, aspartic acid, fumaric acid, folic acid, azelaic acid, diglycolic acid, isophthalic acid, itaconic acid, glutaconic acid, glutamic acid, maleic acid, malic acid, malonic acid, oxalic acid, phthalic acid, pimelic acid, methylmalonic acid, pamoic acid, sebacic acid, suberic acid, succinic acid, tartaric acid, tartronic acid, terephthalic acid, alpha-hydroxyglutaric acid, dodecanedioic acid, dodecylsuccinic anhydride, dodecylsuccinic acid, and the like. The diacid is selected in an amount of, for example, from about 40 to about 60 mole percent, or from about 45 to about 55 mole percent of the polyester resin solids.

Specific examples of optional organic diols that can be reacted with the rosin diols and diacids are alkylene glycols like ethylene glycol, 1,2-propylene glycol, 1,3-propane diol, butylene glycol, pentylene glycol, 1,6-hexane diol, 2-ethyl-hexyl-1,3-propanediol, 1,7-heptane-diol, 1,9-nonanediol, 1,10-decanediol, or 1,4-cyclohexane diol; propoxylated bisphenol A, ethoxylated bisphenol A, 1,4-cyclohexanedimethanol, or hydrogenated bisphenol A, and mixtures thereof. The diols are, for example, selected in an amount of from about 0 to about 25, or from about 5 to about 15 mole percent of the polyester resin solids.

Branching agents, such as multivalent polyacid or polyol, can also be utilized to crosslink or to obtain the branched amorphous bio-based polyesters. Examples of branching agents are 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower, with from 1 to about 6 carbon atoms, alkyl esters; multivalent polyols such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, glycerine carbonate, 2-methylpropanetriol, 2-methyl-1,2,4-butanetriol, trimethylolethane, trimethylolpropane, 1,3,5-trihydroxymethylbenzene, mixtures thereof, and the like.

The branching agent amount selected is, for example, from about 0.1 to about 5, or from about 1 to about 3 mole percent of the polyester resin solids.

The bio content of the obtained amorphous polyester resins can be determined by a number of known methods like based on the amount of the bio derived monomers of rosin acid and glycerine carbonate present in the reaction mixture. Bio content amounts are, for example, from about 45 to about 75, from about 50 to about 70, from about 55 to about 65, and more specifically, from about 55 to about 62 percent by weight of the bio-based amorphous polyester resin.

The bio-based amorphous polyester resins, linear or branched, obtained by the processes disclosed herein, can possess various onset glass transition temperatures (Tg) of, for example, from about 40° C. to about 80° C., or from about 50° C. to about 70° C. as measured by differential scanning calorimetry (DSC). The linear and branched amorphous polyester resins, in embodiments, possess, for example, a number average molecular weight ($M_n$), as measured by gel permeation chromatography (GPC) using polystyrene standards of from about 10,000 to about 500,000, or from about 5,000 to about 250,000, and a weight average molecular weight ($M_w$) of, for example, from about 20,000 to about 600,000, or from about 7,000 to about 300,000, as determined by GPC using polystyrene standards; and a molecular weight distribution ($M_w/M_n$) of, for example, from about 1.5 to about 6, such as from about 2 to about 4.

Crystalline Polyesters

The crystalline polyester resins, which are available from a number of sources, can possess various melting points of, for example, from about 30° C. to about 120° C., and from about 50° C. to about 90° C. (degrees Centigrade). The crystalline resins can possess a number average molecular weight ($M_n$), as measured by gel permeation chromatography (GPC) of, for example, from about 1,000 to about 50,000, or from about 2,000 to about 25,000. The weight average molecular weight ($M_w$) of the crystalline polyester resins can be, for example, from about 2,000 to about 100,000, or from about 3,000 to about 80,000, as determined by GPC using polystyrene standards. The molecular weight distribution ($M_w/M_n$) of the crystalline polyester resin is, for example, from about 2 to about 6, and more specifically, from about 2 to about 4.

The disclosed crystalline polyester resins can be prepared by a polycondensation process by reacting suitable organic diols and suitable organic diacids in the presence of polycondensation catalysts. Generally, a stoichiometric equimolar ratio of organic diol and organic diacid is utilized, however, in some instances, wherein the boiling point of the organic diol is from about 180° C. to about 230° C., an excess amount of diol, such as ethylene glycol or propylene glycol, of from about 0.2 to 1 mole equivalent, can be utilized and removed during the polycondensation process by distillation. The amount of catalyst utilized varies, and can be selected in amounts as disclosed herein, and more specifically, for example, from about 0.01 to about 1, or from about 0.1 to about 0.75 mole percent of the crystalline polyester resin.

Examples of organic diacids or diesters selected for the preparation of the crystalline polyester resins are as illustrated herein, and include fumaric, maleic, oxalic acid, succinic acid, glutaric acid, adipic acid, suberic acid, azelaic acid, sebacic acid, phthalic acid, isophthalic acid, terephthalic acid, napthalene-2,6-dicarboxylic acid, naphthalene-2,7-dicarboxylic acid, cyclohexane dicarboxylic acid, malonic acid and mesaconic acid, a diester or anhydride thereof. The organic diacid is selected in an amount of, for example, from about 40 to about 50 mole percent, or from about 1 to about 10 mole percent of the crystalline polyester resin.

Examples of optional organic diols which include aliphatic diols selected in an amount of, for example, from about 1 to about 10, or from about 3 to about 7 mole percent of the crystalline polyester resin that may be included in the reaction mixture or added thereto, and with from about 2 to about 36 carbon atoms, are 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, alkylene glycols, like ethylene glycol or propylene glycol, and the like.

Examples of crystalline polyesters mixed with the bio-based amorphous polyesters illustrated herein are poly(1,2-ethylene-succinate), poly(1,2-ethylene -adipate), poly(1,2-ethylene-sebacate), poly(1,2-ethylene-decanoate), poly(1,2-ethylene-nonoate), poly(1,2-ethylene-dodeanoate), poly(1,2-ethylene-azeleoate), poly(1,3-propylene-succinate), poly(1,3-propylene-adipate), poly(1,3-propylene -sebacate), poly(1,3-propylene-decanoate), poly(1,3-propylene-nonoate), poly(1,3-propylene-dodeanoate), poly(1,3-propylene-azeleoate), poly(1,4-butylene-succinate), poly(1,4-butylene-adipate), poly(1,4-butylene-sebacate), poly(1,4-butylene decanoate), poly(1,4-butylene-nonoate), poly(1,4-butylene-dodeanoate), poly(1,4-butylene-azeleoate), poly(1,6-hexylene-succinate), poly(1,6-hexylene-adipate), poly(1,6-hexylene-sebacate), poly(1,6-hexylene-decanoate), poly(1,6-hexylene-nonoate), poly(1,6-hexylene-dodeanoate), poly(1,6-hexylene-azeleoate), poly(1,8-octylene-succinate), poly(1,8-octylene-adipate), poly(1,8-octylene-sebacate), poly(1,8-octylene-decanoate), poly(1,8-octylene-nonoate), poly(1,8-octylene-dodeanoate), poly(1,8-octylene-azeleoate), poly(1,9-nonylene-succinate), poly(1,9-nonylene-adipate), poly(1,9-nonylene-sebacate), poly(1,9-nonylene-decanoate), poly(1,9-nonylene-nonoate), poly(1,9-nonylene-dodeanoate), poly(1,9-nonylene-azeleoate), poly(1,10-decylene-succinate), poly(1,10-decylene-adipate), poly(1,10-decylene-sebacate), poly(1,10-decylene-decanoate), poly(1,10-decylene-nonoate), poly(1,10-decylene-dodeanoate), poly(1,10-decylene-azeleoate), and the like, and mixtures thereof.

For the mixtures, various effective amounts of the bio-based amorphous polyesters and the crystalline polyesters can be utilized. For example, the bio-based amorphous polyester can be present in the mixture in amounts of from about 1 to about 99, from about 10 to about 85, from about 18 to about 75, from about 25 to about 65, from about 30 to about 55, and from about 40 to about 60 percent by weight based on the resin mixture components. Generally, a larger amount of bio-based amorphous polyester included in the mixture permits increasing bio-degradability.

The crystalline polyester can be present in the mixture in amounts of from about 1 to about 99, from about 10 to about 85, from about 18 to about 75, from about 25 to about 65, from about 30 to about 55, from about 40 to about 60 percent by weight based on the resin mixture components.

Toner Compositions

Biodegradable (bio) based containing amorphous polyester resins prepared by the processes illustrated herein and crystalline polyesters can be formulated into toner compositions by the mixing thereof with colorants, optional components of waxes, internal additives, surface additives, and the like. In embodiments, the bio-based amorphous polyesters and crystalline polyesters containing toners are prepared by emulsion aggregation methods as described in a number of patents inclusive of U.S. Pat. Nos. 6,130,021; 6,120,967, and 6,628,102, the disclosures of each patent being totally incorporated herein by reference.

More specifically, the toners of the present disclosure can be prepared by emulsion aggregation by (i) generating or providing a latex emulsion containing a mixture of crystalline polyesters and bio-based rosin diol derivable amorphous polyesters generated as described herein, water, and surfactants, and generating or providing a colorant dispersion containing colorant, water, and an ionic surfactant, or a nonionic surfactant; (ii) blending the latex emulsions with the colorant dispersion and optional additives, such as a wax; (iii) adding to the resulting blend a coagulant comprising a polymetal ion coagulant, a metal ion coagulant, a polymetal halide coagulant, a metal halide coagulant, or a mixtures thereof; (iv) aggregating by heating the resulting mixture below or about equal to the glass transition temperature (Tg) of the bio-based amorphous polyester latex resin to form a core; (v) optionally adding a further latex comprised of the bio-based amorphous polyester resin suspended in an aqueous phase resulting in a shell; (vi) introducing a sodium hydroxide solution to increase the pH of the mixture to about 4, followed by the addition of a sequestering agent to partially remove coagulant metal from the aggregated toner in a controlled manner; (vii) heating the resulting mixture of (vi) about equal to or about above the Tg of the latex polyester resins mixture at a pH of from about 5 to about 6; (viii) retaining the heating until the fusion or coalescence of resins and colorant are initiated; (ix) changing the pH of the above (viii) mixture to arrive at a pH of from about 6 to about 7.5 thereby accelerating the fusion or the coalescence, and resulting in toner particles comprised of the bio-based amorphous polyester resins and crystalline polyesters, colorant, and optional additives, and having a final coagulant metal concentration of from about 100 to about 900 or from about 275 to about 700 parts per million based on the total weight of the toner particles; and (x) optionally, isolating the toner.

For the preparation of toner compositions containing the mixtures of the bio-based amorphous polyesters and the crystalline polyesters, there is selected as anionic surfactants sodium dodecylsulfate (SDS), sodium dodecylbenzene sulfonate, sodium dodecylnaphthalene sulfate, dialkyl benzenealkyl, sulfates and sulfonates, adipic acid, available from Aldrich, NEOGEN RK™, NEOGEN SC™ from Daiichi Kogyo Seiyaku or TAYCAPOWER BN2060™ commercially available from Tayca Corporation or DOWFAX™ available from DuPont, and the like. An effective concentration of the anionic surfactant generally employed can be, for example, from about 0.01 to about 10 percent by weight, and more specifically, from about 0.1 to about 5 percent by weight of monomers used to prepare the toner polyester polymer.

Examples of nonionic surfactants that can be selected for the toner emulsion aggregation processes are, for example, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhodia as IGEPAL CA-210™, IGEPAL CA-520™, IGEPAL CA-720™, IGEPAL CO-890™, IGEPAL CO-720™, IGEPAL CO-290™, ANTAROX890™ and ANTAROX897™. A suitable concentration of the nonionic surfactant can be, for example, from about 0.01 to about 10 percent by weight, or from about 0.1 to about 5 percent by weight of monomers used to prepare the toner polyester polymer resin.

Examples of additional surfactants selected in various amounts of, for example, from about 0.01 to about 10 percent by weight, or from about 0.1 to about 5 percent by weight of monomers used to prepare the toner polymer resin or resins, and which may be optionally added to the formed aggregate suspension prior to or during the coalescence to, for example, prevent the aggregates from growing in size, or for stabilizing the aggregate size with increasing temperature are anionic surfactants, such as sodium dodecylbenzene sulfonate, sodium dodecylnaphthalene sulfate, dialkyl benzenealkyl, sulfates and sulfonates, adipic acid, available from Aldrich, NEOGEN R™, NEOGEN SC™ available from Daiichi Kogyo Seiyaku, and the like.

In a specific toner emulsion process of the present disclosure, the aggregate mixture is heated to a temperature of from about 30° C. to about 50° C. to generate aggregate composites with a particle size of from about 3 to about 15 microns in diameter, followed by adjusting the pH to about 6 to about 9 to freeze the toner composite particle size, and optionally adding a metal sequestering agent, then heating the aggregate composites to a temperature of from about 63° C. to about 90° C., and optionally adjusting the pH to about 8 to about 5.5 to result in coalesced toner particles, and washing and drying the toner particles.

There can be added to the bio-based amorphous and crystalline polyester latexes sequestering or complexing components as illustrated herein, and which components are, for example, selected from the group consisting of ethylenediaminetetraacetic acid, gluconal, sodium gluconate, potassium citrate, sodium citrate, nitrotriacetate salt, humic acid, and fulvic acid; salts of ethylenediaminetetraacetic acid, gluconal, sodium gluconate, potassium citrate, sodium citrate, nitrotriacetate salt, humic acid, and fulvic acid; alkali metal salts of ethylenediaminetetraacetic acid, gluconal, sodium gluconate, potassium citrate, sodium citrate, nitrotriacetate salt, humic acid, and fulvic acid; sodium salts of ethylenediaminetetraacetic acid, gluconal, sodium gluconate, tartaric acid, gluconic acid, oxalic acid, polyacrylates, sugar acrylates, citric acid, potassium citrate, sodium citrate, nitrotriacetate salt, humic acid, and fulvic acid; potassium salts of ethylenediaminetetraacetic acid, gluconal, sodium gluconate, potassium citrate, sodium citrate, nitrotriacetate salt, humic acid, and fulvic acid; and calcium salts of ethylenediaminetetraacetic acid, gluconal, sodium gluconate, potassium citrate, sodium citrate, nitrotriacetate salt, humic acid, fulvic acid, calcium disodium ethylenediaminetetraacetate dehydrate, diammoniumethylenediaminetetraacetic acid, pentasodium diethylenetriaminepentaacetic acid sodium salt, trisodium N-(hydroxyethyl)ethylenediaminetriacetate, polyasparic acid, diethylenetriamine pentaacetate, 3-hydroxy-4-pyridinone, dopamine, eucalyptus, iminodisuccinic acid, ethylenediaminedisuccinate, polysaccharide, sodium ethylenedinitrilotetraacetate, nitrilo triacetic acid sodium salt, thiamine pyrophosphate, farnesyl pyrophosphate, 2-aminoethylpyrophosphate, hydroxyl ethylidene-1,1-diphosphonic acid, aminotrimethylenephosphonic acid, diethylene triaminepentamethylene phosphonic acid, ethylenediamine tetramethylene phosphonic acid, and mixtures thereof.

Examples of coagulants selected for the emulsion aggregation preparation of the toners illustrated herein include cationic surfactants of, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL B™ (benzalkonium chloride), available from Kao Chemicals, and the like, and mixtures thereof. The cationic coagulant can be present in an aqueous medium in an amount of from, for example, from about 0.05 to about 12 percent by weight, or from about 0.075 to about 5 percent by weight of total solids in the toner. The coagulant may also contain minor amounts of other components like, for example, nitric acid.

Inorganic cationic coagulants selected for the toner processes illustrated herein include, for example, polyaluminum chloride (PAC), polyaluminum sufosilicate, aluminum sulfate, zinc sulfate, magnesium sulfate, chlorides of magnesium, calcium, zinc, beryllium, aluminum, sodium, other metal halides, including monovalent and divalent halides. The inorganic coagulant can be present in an aqueous medium in an amount of from, for example, from about 0.05 to about 10 percent by weight, or from about 0.075 to about 5.0 percent by weight of total solids in the toner. The coagulant may also contain minor amounts of other components like, for example, nitric acid.

In embodiments, the toner emulsion aggregation coagulant may comprise a mixture of both an inorganic and an organic coagulant including, for example, PAC™ and SANIZOL B™, or aluminum sulfate and SANIZOL B™. These mixtures of coagulants are also used in an aqueous medium, each of the coagulants being present in an amount of, for example, from about 0.05 to about 5.0 percent by weight of total solids in the toner.

Inorganic complexing components selected for the toner processes illustrated herein can be selected from the group consisting of sodium silicate, potassium silicate, magnesium sulfate silicate, sodium hexameta phosphate, sodium polyphosphate, sodium tripolyphosphate, sodium trimeta phosphate, sodium pyrophosphate, bentonite, and talc, and the like. The inorganic complexing components can be selected in an amount of about 0.01 weight percent to about 10 weight percent, or from about 0.4 weight percent to about 4 weight percent based upon the total weight of the toner solids.

The toner colorant dispersion can be selected, for example, from cyan, magenta, yellow, or black pigment dispersions of each color in an anionic surfactant, or optionally in a non-ionic surfactant to provide, for example, pigment particles having a volume average particle diameter size of, for example, from about 50 nanometers to about 300 nanometers, and from about 125 to about 200 nanometers. The surfactant used to disperse each colorant can be any number of known components such as, for example, an anionic surfactant like NEOGEN RKTM. Known Ultimizer equipment can be used to provide the colorant dispersion, although media mill or other known processes can be utilized.

Examples of toner colorants include pigments, dyes, mixtures of pigments and dyes, mixtures of pigments, mixtures of dyes, and the like. In embodiments, the colorant comprises carbon black, magnetite, black, cyan, magenta, yellow, red, green, blue, brown, mixtures thereof selected, for example, in an amount of from about 1 to about 25 percent by weight based upon the total weight of the composition.

Specific toner colorants that may be selected include PALIOGEN VIOLET 5100™ and 5890™ (BASF), NORMANDY MAGENTA RD-2400™ (Paul Ulrich), PERMANENT VIOLET VT2645™ (Paul Ulrich), HELIOGEN GREEN L8730™ (BASF), ARGYLE GREEN XP-111-S™ (Paul Ulrich), BRILLIANT GREEN TONER GR 0991™ (Paul Ulrich), LITHOL SCARLET D3700™ (BASF), TOLUIDINE RED™ (Aldrich), Scarlet for THERMOPLAST NSD RED™ (Aldrich), LITHOL RUBINE TONER™ (Paul Ulrich), LITHOL SCARLET 4440™, NBD 3700™ (BASF), BON RED C™ (Dominion Color), ROYAL BRILLIANT RED RD-8192™ (Paul Ulrich), ORACET PINK RF™ (Ciba Geigy), PALIOGEN RED 3340™ and 3871K™ (BASF), LITHOL FAST SCARLET L4300™ (BASF), HELIOGEN BLUE D6840™, D7080™, K7090™ K6910™ and L7020™ (BASF), SUDAN BLUE OS™ (BASF), NEOPEN BLUE FF4012™ (BASF), PV FAST BLUE B2G01™ (American Hoechst), IRGALITE BLUE BCA™ (Ciba Geigy), PALIOGEN BLUE 6470™ (BASF), SUDAN II™, III™ and IV™ (Matheson, Coleman, Bell), SUDAN ORANGE™ (Aldrich), SUDAN ORANGE 220™ (BASF), PALIOGEN ORANGE 3040™ (BASF), ORTHO ORANGE OR 2673™ (Paul Ulrich), PALIOGEN YELLOW 152™ and 1560™ (BASF), LITHOL FAST YELLOW 0991K™ (BASF), PALIOTOL YELLOW 1840™ (BASF), NOVAPERM YELLOW FGL™ (Hoechst), PERMANERIT YELLOW YE 0305™ (Paul Ulrich), LUMOGEN YELLOW D0790™ (BASF), SUCO-GELB 1250™ (BASF), SUCO-YELLOW D1355™ (BASF), SUCO FAST YELLOW D1165™, D1355™ and D1351™ (BASF), HOSTAPERM PINK E™ (Hoechst), FANAL PINK D4830™ (BASF), CINQUASIA MAGENTA™ (DuPont), PALIOGEN BLACK L9984™ (BASF), PIGMENT BLACK K801™ (BASF) and carbon blacks such as REGAL® 330 (Cabot), CARBON BLACK 5250™ and 5750™ (Columbian Chemicals), and the like, or mixtures thereof.

Colorant examples include pigments present in water based dispersions, such as those commercially available from Sun Chemical, such as for example SUNSPERSE BHD 6011™ (Blue 15 Type), SUNSPERSE BHD 9312™ (Pigment Blue 15), SUNSPERSE BHD 6000™ (Pigment Blue 15:3 74160), SUNSPERSE GHD 9600™ and GHD 6004™ (Pigment Green 7 74260), SUNSPERSE QHD 6040™ (Pigment Red 122), SUNSPERSE RHD 9668™ (Pigment Red 185), SUNSPERSE RHD 9365™ and 9504™ (Pigment Red 57), SUNSPERSE YHD 6005™ (Pigment Yellow 83), FLEXIVERSE YFD 4249™ (Pigment Yellow 17), SUNSPERSE YHD 6020™ and 6045™ (Pigment Yellow 74), SUNSPERSE YHD 600™ and 9604™ (Pigment Yellow 14), FLEXIVERSE LFD 4343™ and LFD 9736™ (Pigment Black 7) and the like, or mixtures thereof. Other useful water-based colorant dispersions include those commercially available from Clariant, for example, HOSTAFINE Yellow GR™, HOSTAFINE Black T™ and Black TS™, HOSTAFINE Blue B2G™, HOSTAFINE Rubine F6B™ and magenta dry pigment, such as Toner Magenta 6BVP2213 and Toner Magenta EO2, which pigments can be dispersed in water and/or surfactants.

Examples of toner pigments selected and available in the wet cake or concentrated form containing water can be easily dispersed in water utilizing a homogenizer, or simply by stirring, ball milling, attrition, or media milling. In other instances, pigments are available only in a dry form, whereby a dispersion in water is effected by microfluidizing using, for example, a M-110 microfluidizer or an Ultimizer, and passing the pigment dispersion from about 1 to about 10 times through the microfluidizer chamber, or by sonication, such as using a Branson 700 sonicator, or a homogenizer, ball milling, attrition, or media milling with the optional addition of dispersing agents such as the aforementioned ionic or non-ionic surfactants.

Further colorant examples are magnetites, such as Mobay magnetites MO8029™, MO8960™; Columbian magnetites, MAPICO BLACKS™ and surface treated magnetites; Pfizer magnetites CB4799™, CB5300™, CB5600™ MCX6369™; Bayer magnetites, BAYFERROX 8600™, 8610™; Northern Pigments magnetites, NP-604™, NP-608™; Magnox magnetites TMB-100™ or TMB-104™; and the like, or mixtures thereof.

Specific additional examples of pigments present in the toner in an amount of from 1 to about 40, from 1 to about 20, or from 1 to about 10 weight percent of total solids include phthalocyanine HELIOGEN BLUE L6900™, D6840™ D7080™, D7020™, PYLAM OIL BLUE™, PYLAM OIL YELLOW™, PIGMENT BLUE 1™ available from Paul Ulrich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Examples of magentas include, for example, 2,9-dimethyl substituted quinacridone and anthraquinone dye identified in the Color Index as CI 60710, CI Dispersed Red 15, diazo dye identified in the Color Index as CI 26050, CI Solvent Red 19, and the like, or mixtures thereof. Illustrative examples of cyans include copper tetra(octadecyl sulfonamide)phthalocyanine, x-copper phthalocyanine pigment listed in the Color Index as CI74160, CI Pigment Blue, and Anthrathrene Blue identified in the Color Index as DI 69810, Special Blue X-2137, and the like, or mixtures thereof. Illustrative examples of yellows that may be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,4-dimethoxy acetoacetanilide, and Permanent Yellow FGL. Colored magnetites, such as mixtures of MAPICO BLACK™ and cyan components, may also be selected as pigments. The pigment dispersion comprises pigment particles dispersed in an aqueous medium with an anionic dispersant/surfactant or a nonionic dispersant/surfactant, and the wherein the dispersant/surfactant amount is in the range of from about 0.5 to about 10 percent.

Toner colorant amounts vary, and can be, for example, from about 1 to about 50, from about 2 to about 40, from about 2 to about 30, from 1 to about 25, from 1 to about 18, from 1 to about 12, from 1 to about 6 weight percent of total solids. When magnetite pigments are selected for the toner, the amounts thereof can be up to about 80 weight percent of solids, like from about 40 to about 80, or from about 50 to about 75 weight percent based on the total solids.

Examples of optional waxes included in the toner or on the toner surface include polyolefins, such as polypropylenes, polyethylenes, and the like, such as those commercially available from Allied Chemical and Baker Petrolite Corporation; wax emulsions available from Michaelman Inc. and the Daniels Products Company; EPOLENE N-15™ commercially available from Eastman Chemical Products, Inc.; VISCOL 550-P™, a low weight average molecular weight polypropylene available from Sanyo Kasei K. K., and similar materials. Examples of functionalized waxes that can be selected for the disclosed toners include amines, amides, for example, AQUA SUPERSLIP 6550™, SUPERSLIP 6530™ available from Micro Powder Inc.; fluorinated waxes, for example, POLYFLUO 190™, POLYFLUO 200™, POLYFLUO 523XF™, AQUA POLYFLUO 411™, AQUA POLYSILK 19™, POLYSILK 14™ available from Micro Powder Inc.; mixed fluorinated, amide waxes, for example, MICROSPERSION 19™ also available from Micro Powder Inc.; imides, esters, quaternary amines, carboxylic acids or acrylic polymer emulsion, for example, JONCRYL 74™, 89™, 130™, 537™, and 538™, all available from SC Johnson Wax; chlorinated polypropylenes and polyethylenes available from Allied Chemical and Petrolite Corporation, and from SC Johnson Wax. A number of these disclosed waxes can optionally be fractionated or distilled to provide specific cuts that meet viscosity and/or temperature criteria wherein the viscosity is, for example, about 10,000 cps and the temperature is 100° C.

In embodiments, the wax is in the form of a dispersion comprising, for example, a wax having a particle diameter of about 100 nanometers to about 500 nanometers, or about 100 nanometers to about 300 nanometers, water, and an anionic surfactant or a polymeric stabilizer, and optionally a nonionic surfactant. In embodiments, the wax comprises polyethylene wax particles, such as POLYWAX® 655, or POLYWAX® 725, POLYWAX® 850, POLYWAX® 500 (the POLYWAX® waxes being commercially available from Baker Petrolite) and, for example, fractionated/distilled waxes, which are distilled parts of commercial POLYWAX® 655 designated here as X1214, X1240, X1242, X1244, and the like, but are not limited to POLYWAX® 655 cuts. Waxes providing a specific cut that meet the viscosity/temperature criteria, wherein the upper limit of viscosity is about 10,000 cps and the temperature upper limit is about 100° C. can be used. These waxes can have a particle diameter in the range of from about 100 to about 500 nanometers, although not limited. Other wax examples include FT-100 waxes from Shell (SMDA), and FNP0092 from Nippon Seiro. The surfactant used to disperse the wax can be an anionic surfactant, such as, for example, NEOGEN RK® commercially available from Daiichi Kogyo Seiyaku or TAYCAPOWER® BN2060 commercially available from Tayca Corporation, or DOWFAX® available from DuPont.

The toner wax amount is in embodiments from about 0.1 to about 20, from about 0.5 to about 15, from about 1 to about 12, from about 1 to about 10, from about 1 to about 5, from about 1 to about 3 weight percent base on the toner solids.

The toner compositions disclosed may also include known charge additives in effective amounts, such as, from about 0.1 to about 5 weight percent, such as alkyl pyridinium halides, bisulfates, the charge control additives of U.S. Pat. Nos. 3,944,493; 4,007,293; 4,079,014; 4,394,430, and 4,560,635, the disclosures of which are totally incorporated herein by reference, and the like. Surface additives that can be added to the toner compositions after washing or drying include, for example, metal salts, metal salts of fatty acids, colloidal silicas, metal oxides, mixtures thereof, and the like, which additives are usually present in an amount of from about 0.1 to about 2 weight percent, reference U.S. Pat. Nos. 3,590,000, 3,720,617, 3,655,374, and 3,983,045, the disclosures of which are totally incorporated herein by reference. Examples of specific suitable additives include zinc stearate and AEROSIL R972® available from Degussa in amounts of from about 0.1 to about 2 percent which can be added during the aggregation process or blended into the formed toner product.

The toner compositions of the present disclosure in one specific aspect thereof are prepared as follows. A mixture is provided comprising a latex emulsion containing the bio-based amorphous polyester particles, a latex emulsion comprising the crystalline polyester resin particles, water, a surfactant, a colorant dispersion containing colorant, water, and an ionic surfactant, or a nonionic surfactant and wax is prepared. The pH of the resulting mixture is adjusted by an acid, such as acetic acid, nitric acid, and the like, such that the pH of the mixture is from about 2 to about 4.5, although the pH can be outside of this range. Additionally, if desired, the mixture can be homogenized. Homogenization can be performed by mixing at from about 600 to about 4,000 revolutions per minute, although the speed of mixing can be outside of this range. Homogenization can be performed by any desired or effective method, for example, with an IKA ULTRA TURRAX T50 probe homogenizer.

Following preparation of the above mixture, an aggregating agent can be added thereto. Any desired or effective aggregating agent can be used to form the toner aggregates. Suitable aggregating agents include, but are not limited to, aqueous solutions of divalent cations or multivalent cations. Specific examples of aggregating agents include polyaluminum halides, such as polyaluminum chloride (PAC), or the corresponding bromide, fluoride, or iodide, polyaluminum silicates, such as polyaluminum sulfosilicate (PASS), and water soluble metal salts, including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and the like, and mixtures thereof. In specific embodiments, the aggregating agent can be added to the mixture at a temperature below about the glass transition temperature (Tg) of the bio-based resin, such as from about 45 to about 55° C.

The aggregating agent can be added to the mixture used to form the toner aggregates in any desired or effective amount as illustrated herein, in one embodiment at least about 0.1 percent by weight, in another embodiment at least about 0.2 percent by weight, and in yet another embodiment at least about 0.5 percent by weight, and in one embodiment no more than about 8 percent by weight.

To control aggregation and coalescence of the particles, the aggregating agent can, if desired, be metered into the mixture selected over a period of time. For example, the agent can be metered into the mixture over a period of, in one embodiment, at least from about 5 minutes to about 240 minutes, from about 5 to about 200 minutes, from about 10 to about 100 minutes, from about 15 to about 50 minutes, or from about 5 to about 30 minutes. The addition of the agent can also be performed while the mixture is maintained under stirred conditions of about 50 rpm to about 1,000 rpm, from about 100 to about 500 rpm, although the mixing speed can be outside of these ranges, and at a temperature that is below the glass transition temperature of the bio-based resin or the bio-based amorphous polyester resin crystalline polyester mixture of at from about 30° C. to about 90° C., from about 35° C. to about 70° C., although the temperature can be outside of these ranges.

The particles formed can be permitted to aggregate until a predetermined desired particle size is obtained. A predetermined desired size refers to the desired particle size as determined prior to formation, with the particle size being monitored during the growth process until the desired particle size is achieved. Composition samples can be removed during the growth process and analyzed, for example, with a Coulter Counter for average particle size. Aggregation can thus proceed by maintaining the elevated temperature, or by slowly raising the temperature to, for example, from about 40° C. to about 100° C. (although the temperature can be outside of this range), and holding the mixture at this temperature for a time of from about 0.5 hour to about 6 hours, in embodiments of from about hour 1 to about 5 hours (although time periods outside of these ranges can be used), while maintaining stirring to provide the aggregated particles. Once the predetermined desired particle size is reached, the growth process is halted.

The growth and shaping of the particles following addition of the aggregation agent can be performed under any suitable conditions. For example, the growth and shaping can be conducted under conditions in which aggregation occurs separate from coalescence.

For separate aggregation and coalescence stages, the aggregation process can be conducted under shearing conditions at an elevated temperature, for example, of from about 40° C. to about 90° C., in embodiments of from about 45° C. to about 80° C., which may be below the glass transition temperature of the bio-based resin as illustrated herein.

Shell Formation

An optional shell can then be applied to the aggregated toner particles obtained in the form of a core. The bio-based resins described herein are suitable for the shell resin. The shell resin can be applied to the aggregated particles by any desired or effective method. For example, the shell resin can be in an emulsion that includes a surfactant. The previously formed aggregated particles can be combined with the shell resin emulsion so that the shell resin forms a shell over the formed aggregates. In one specific embodiment, the bio-based amorphous polyesters can be used to form a shell over the aggregates resulting in toner particles having a core-shell configuration.

Once the desired final size of the toner particles is achieved, the pH of the mixture can be adjusted with a base to a value in one embodiment of from about 6 to about 10, and in another embodiment of from about 6.2 to about 7, although a pH outside of these ranges can be used. The adjustment of the pH can be used to freeze, that is to stop, toner growth. The base used to stop toner growth can include any suitable base, such as alkali metal hydroxides, including sodium hydroxide and potassium hydroxide, ammonium hydroxide, combinations thereof, and the like. In specific embodiments, ethylene diamine tetraacetic acid (EDTA) can be added to help adjust the pH to the desired values noted above. In specific embodiments, the base can be added in amounts of from about 2 to about 25 percent by weight of the mixture, and in more specific embodiments from about 4 to about 10 percent by weight of the mixture, although amounts outside of these ranges can be used.

Following aggregation to the desired particle size, with the formation of the optional shell as described herein, the particles can then be coalesced to the desired final shape, the coalescence being achieved by, for example, heating the mixture to any desired or effective temperature of from about 55° C. to about 100° C., from about 65° C. to about 75° C., or about 70° C., although temperatures outside of these ranges can be used, which can be below the melting point of the crystalline resin to prevent plasticization. Higher or lower temperatures may be used, it being understood that the temperature is a function of the resins and resin mixtures selected.

Coalescence can proceed and be performed over any desired or effective period of time, such as from about 0.1 hour to about 10 hours, from about 0.5 hour to about 8 hours, or no more than about 4 hours, although periods of time outside of these ranges can be used.

After coalescence, the above mixture can be cooled to room temperature, typically from about 20° C. to about 25° C. (although temperatures outside of this range can be used). The cooling can be rapid or slow, as desired. A suitable cooling method can include introducing cold water to a jacket around the reactor. After cooling, the toner particles can be optionally washed with water and then dried. Drying can be accomplished by any suitable method for drying including, for example, freeze drying resulting in toner particles possessing a relatively narrow particle size distribution with a lower number ratio geometric standard deviation (GSDn) of from about 1.15 to about 1.40, from about 1.18 to about 1.25, from about 1.20 to about 1.35, or from about 1.25 to about 1.35.

The toner particles prepared in accordance with the present disclosure can have a volume average diameter as disclosed herein (also referred to as "volume average particle diameter" or "D50v"), and more specifically, from about 1 to about 25, from about 1 to about 15, from about 1 to about 10, from about 2 to about 5 microns. D50v, GSDv, and GSDn can be determined by using a measuring instrument, such as a Beckman Coulter Multisizer 3, operated in accordance with the manufacturer's instructions. Representative sampling can occur as follows: a small amount of toner sample, about 1 gram, can be obtained and filtered through a 25 micrometer screen, then placed in isotonic solution to obtain a concentration of about 10 percent, with the sample then being subjected to a Beckman Coulter Multisizer 3.

The disclosed toner particles can have a shape factor of from about 105 to about 170, and from about 110 to about 160, SF1*a, although the value can be outside of these ranges. Scanning electron microscopy (SEM) can be used to determine the shape factor analysis of the toners by SEM and image analysis (IA). The average particle shapes are quantified by employing the following shape factor (SF1*a) formula SF1*a=100 d2/(4A), where A is the area of the particle and d is its major axis. A perfectly circular or spherical particle has a shape factor of exactly 100. The shape factor SF1*a increases as the shape becomes more irregular or elongated in shape with a higher surface area.

Additionally, the toners disclosed herein possess low melting properties, thus these toners may be a low melt or ultra-low melt toner. Low melt toners display a melting point of from about 80° C. to about 130° C., and from about 90° C. to about 120° C. while ultra-low melt toners display a melting point of from about 50° C. to about 100° C., and from about 55° C. to about 90° C.

The present disclosure provides a method of developing a latent xerographic image, comprising applying the toner composition described herein to a photoconductor, transferring the developed image to a suitable substrate like paper, and fusing the toner composition to the substrate by exposing the toner composition to heat and pressure.

Specific embodiments will now be described in detail. These examples are intended to be illustrative, and not limited to the materials, conditions, or process parameters set forth in these embodiments. All parts are percentages by solid weight unless otherwise indicated.

EXAMPLE I

A bio-based amorphous polyester resin was prepared by (i) generating a rosin diol from an abietic acid containing rosin acid, glycerine carbonate, and a tetraethyl ammonium iodide catalyst, followed by (ii) adding thereto isophthalic acid, dodecylsuccinic anhydride, 1,6-hexanediol, and a dibutyl tin oxide catalyst.

A 1 liter Parr reactor equipped with a mechanical stirrer, distillation apparatus and bottom drain valve was charged with 302.4 grams (1 mole) of abietic acid available from TCI America, and comprised of a minimum of 70 percent of abietic acid with the remaining 30 percent being comprised of a proprietary mixture of other rosin acids, 132 grams (1.12 moles) of glycerine carbonate available from Huntsman Corporation, and 1 gram (0.004 mole) of tetraethyl ammonium iodide. The resulting mixture was then heated to 160° C., and stirred for 6 hours. The acid value was then measured by titration to be 3 milligrams of potassium hydroxide per gram of sample (mg KOH/g).

To the above mixture was then added 68 grams of 1,6-hexanediol (0.59 mole), 199.2 grams (1.2 moles) of isophthalic acid, 79.8 grams (0.3 mole) of dodecylsuccinic anhydride, and 1.2 grams of the dibutyl tin oxide catalyst FASAT 4100. The resulting mixture was heated to 225° C. over a 4 hour period, and maintained at this temperature until the softening point of the obtained polyester resin was 113.6° C. There resulted a bio-based amorphous polyester that was discharged through the bottom drain valve and allowed to cool to room temperature, from about 23° C. to about 25° C. The glass transition temperature for the resulting bio-based amorphous polyester was 51.1° C. as determined by DSC, and this polyester had an average number molecular weight of 2,400 grams/mole and a weight average molecular weight of 34,882 grams/mole as determined by Gel Permeation Chromatography. An acid value of 13.9 milligrams KOH/gram was measured for the obtained bio-based amorphous polyester.

The bio content of the above obtained amorphous polyester resin was about 55.4 percent by weight based on the amount of the bio derived monomers of rosin acid and glycerine carbonate present in the above reaction mixture. Thus, the bio component content of the resulting bio-based amorphous polyester was derived from 44.6 percent by weight of the rosin acid, and 10.8 percent by weight of the glycerine component (44.6+10.8=55.4).

An emulsion of the above prepared bio-based amorphous polyester resin was prepared by dissolving 100 grams of this resin in 100 grams of methyl ethyl ketone and 3 grams of isopropanol. The mixture obtained was then heated to 40° C. with stirring, and to this mixture was added dropwise 5.5 grams of ammonium hydroxide (10 percent aqueous solution), after which 200 grams of water was added dropwise over a 30 minute period. The resulting dispersion was then heated to 80° C., and the methyl ethyl ketone was removed by distillation to result in a 41.4 percent solid dispersion of the bio-based amorphous polyester resin in water. The bio-based amorphous polyester emulsion particles were measured by an electron microscope to be 155 nanometers in size diameter.

EXAMPLE II

A bio-based amorphous polyester resin was prepared by (i) generating a rosin-diol from a dehydroabietic acid containing rosin acid, glycerine carbonate, and a tetraethyl ammonium iodide catalyst, followed by (ii) adding thereto isophthalic acid, dodecylsuccinic anhydride, 1,6-hexanediol, and dibutyl tin oxide catalyst as follows.

To a 1 liter Parr reactor equipped with a mechanical stirrer, distillation apparatus and bottom drain valve, there were charged 302.4 grams (1 mole) of Rosin KR-614™ available from Arakawa Chemicals, and comprised of 85 percent (by weight of solids throughout) of dehydroabietic acid with the remaining 15 percent of the mixture comprising proprietary rosin acids, 134.5 grams (1.16 moles) of glycerine carbonate available from Huntsman Corporation, and 1 gram (0.004 mole) of 2-methyl imidazole. The resulting mixture was heated to 160° C., and stirred for 6 hours, resulting in an acid value of 1 milligram KOH/gram.

To the mixture formed, there were then added 68 grams of 1,6-hexanediol (0.59 mole), 199.2 grams (1.2 moles) of isophthalic acid, 79.8 grams (0.3 mole) of dodecylsuccinic anhydride, and 1.2 grams of FASAT 4100 catalyst. The mixture obtained was heated to 225° C. over a 4 hour period, and maintained at this temperature until the softening point of the polyester resin was 112.1° C. The resulting bio-based amorphous polyester was then discharged through the bottom drain valve and allowed to cool to room temperature.

The bio content of the above obtained amorphous polyester resin was about 55.4 percent by weight of the resin, based on the amount of the bio derived monomers of rosin acid and glycerine carbonate present in the reaction mixture.

The glass transition temperature of the above bio-based amorphous polyester was 53.5° C. as determined by DSC, with an average number molecular weight of 2,400 grams/mole, and a weight average molecular weight of 17,507 grams/mole as determined by Gel Permeation Chromatography. The acid value of the bio-based amorphous polyester was 13.4 milligrams KOH/g.

An emulsion of the above bio-based amorphous polyester resin was then prepared by dissolving 100 grams of this resin with 100 grams of methyl ethyl ketone and 3 grams of isopropanol. The resulting mixture was then heated to 40° C. with stirring, and to this mixture were added dropwise 5.5 grams of ammonium hydroxide (10 percent aqueous solution), after which 200 grams of water were added dropwise over a 30 minute period. The resulting dispersion was then heated to 80° C., and the organic solvent of methyl ethyl ketone was distilled off to result in a 41.8 percent solid dispersion of the obtained bio-based amorphous polyester in water. The bio-based polyester emulsion particles were measured to be 165 nanometers in size diameter.

The bio content of the above obtained amorphous polyester resin was about 41.8 percent by weight of the resin, based on the amount of the bio derived monomers of rosin acid and glycerine carbonate present in the reaction mixture.

EXAMPLE III

A bio-based amorphous polyester resin was prepared by (i) generating a rosin diol from a hydrogenated rosin acid, glycerine carbonate, and a tetraethyl ammonium iodide catalyst, followed by (ii) adding thereto terephthalic acid, dodecylsuccinic anhydride, 2-ethyl-2-butyl-1,3-propanediol, and a dibutyl tin oxide catalyst.

A 1 liter Parr reactor equipped with a mechanical stirrer, distillation apparatus, and bottom drain valve was charged with 393.1 grams of ROSIN FLORAL AX™ available from Pinova, and comprised of hydrogenated rosin acids, 142 grams of glycerine carbonate available from Huntsman Corporation, and 0.8 gram of 2-methyl imidazole catalyst. The mixture resulting was heated to 160™, and stirred for 6 hours. The acid value was then measured to be 0.9 milligram KOH/g.

To the above resulting mixture were then added 57 grams of 2-ethyl-2-butyl-1,3-propanediol, 189 grams of terephthalic acid, 79.8 grams (0.3 mole) of dodecylsuccinic anhydride, and 1.2 grams of FASAT 4100™ catalyst. The mixture obtained was heated to 225° C. over a 4 hour period, and maintained at this temperature until the softening point of the resin was 115.1° C. The bio-based amorphous polyester formed was then discharged through the bottom drain valve and allowed to cool to room temperature. A glass transition temperature of 56.9° C. was obtained for the bio-based amorphous polyester as determined by DSC, with an average number molecular weight of 2,450 grams/mole and weight average molecular weight of 11,454 grams/mole as measured by Gel Permeation Chromatography. The acid value of the bio-based amorphous polyester was 11.5 milligrams KOH/g.

The bio content of the above obtained amorphous polyester resin was about 63.2 percent by weight of the resin, based on the amount of the bio derived monomers of rosin acid and glycerine carbonate added in the reaction mixture.

An emulsion of the above bio-based amorphous polyester resin was then prepared by dissolving 100 grams of this resin in 100 grams of methyl ethyl ketone, and 3 grams of isopropanol. The mixture resulting was then heated to 40° C. with stirring, and to this mixture were added dropwise 5.5 grams of ammonium hydroxide (10 percent aqueous solution), after which 200 grams of water were added dropwise over a 30 minute period. The resulting dispersion was then heated to 80° C., and the organic solvent of methyl ethyl ketone was distilled off to result in a 41.5 millimeter percent solid dispersion of the bio-based amorphous polyester in water. The bio-based polyester emulsion particles were measured to be 180 nanometers in size diameter.

EXAMPLE IV

Preparation of a Crystalline Polyester Resin Derived from Sebacic Acid and 1,9-nonanediol In a 2 liter Hoppes reactor equipped with a heated bottom drain valve, high viscosity double turbine agitator, and a distillation receiver with a cold water condenser were charged 900 grams of sebacic acid, obtained from Sigma-Aldrich, 84 grams of fumaric acid, obtained from Sigma-Aldrich, 655.2 grams of ethylene glycol, obtained from Sigma-Aldrich, and 1.5 grams of the catalyst butyl tin oxide hydroxide obtained from Arkema Inc. The reactor was heated to 190° C. with stirring for 3 hours, and then heated to 210° C. over a one hour period, after which the pressure was slowly reduced from atmospheric pressure to about 260 Torr over a one hour period, then reduced to 5 Torr over a two hour period, and then further reduced to about 1 Torr over a 30 minute period. The resulting polymer was then allowed to cool to 185° C., then 24 grams of trimellitic anhydride obtained from Sigma-Aldrich were added, and the mixture resulting was stirred for an additional hour followed by discharge through the bottom drain. The crystalline polyester resin obtained had a softening point of 93° C. (29 poise viscosity measured by cone and plate viscometer at 199° C.), a melting point range of 70° C. to 80° C. as measured by DSC, and an acid value of 10 milligrams KOH/g.

An aqueous emulsion of the above obtained crystalline polyester resin poly(1,9-nonylene-succinate) was prepared by dissolving 100 grams of this resin in ethyl acetate (600 grams). The mixture was then added to 1 liter of water containing 2 grams of sodium bicarbonate, and homogenized for 20 minutes at 4,000 rpm, followed by heating to 80° C. to 85° C. to distill off the ethyl acetate. The resultant aqueous crystalline polyester emulsion had a solids content of 35.17 percent by weight and displayed a particle size of 155 nanometers.

Preparation of Toner Compositions:

EXAMPLE V

A toner was prepared by forming a core of 6.8 percent of a crystalline polyester resin, 3.5 percent (percent by weight throughout) of a cyan pigment, 9 percent of wax and 52.6 percent of a bio-based amorphous polyester resin, and then aggregated onto the core an additional 28 percent of the bio-based amorphous polyester resin to form a shell.

Into a 2 liter glass reactor equipped with an overhead mixer were added 85.7 grams of the bio-based amorphous polyester resin emulsion of Example I, 13.81 grams of the crystalline polyester resin emulsion of Example IV, 24.38 grams of the cyan pigment PB15:3™ (17.21 weight percent), and 21.58 grams of a polyethylene wax aqueous dispersion (30 percent by weight) which was generated using P725 polyethylene wax available from Baker-Petrolite with a weight average molecular weight of 725 grams/mole, and a melting point of 104° C., together with 2 percent by weight of sodium dodecylbenzenesulfonate surfactant, and wherein the particle size of the aqueous dispersion solids was 200 nanometers.

Separately, 0.75 gram of $Al_2(SO_4)_3$ (27.85 weight percent) was added to the above mixture as the flocculent with homogenization. The resulting mixture was then heated to 32.8° C. to aggregate the particles while stirring at 300 rpm. The particle size was monitored with a Coulter Counter until the core reached a volume average particle size of 4.44 microns with a GSD volume of 1.23, and then 47.35 grams of the bio-based amorphous resin emulsion of Example I were added as a shell material, resulting in core-shell structured particles with an average particle size of 5.42 microns, and GSD volume of 1.21. Thereafter, the pH of the obtained reaction slurry was increased from about 3 to 7.98 by adding 4 weight percent of a NaOH solution followed by the addition of 2.69 grams of EDTA (39 weight percent) to freeze or prevent toner growth.

After freezing, the reaction mixture was heated to 80.6° C., and the pH was reduced to 7.46 by adding an acetic acid/sodium acetate (HAc/NaAc) buffer solution (pH 5.7) for coalescence. The toner resulting was quenched into water after coalescence, resulting in a final toner particle size (diameter throughout) of 6.08 microns, a GSD volume of 1.31, and GSD number 1.29. The toner slurry was then cooled to room temperature, separated by sieving (25 millimeters), filtration, followed by washing, and freeze dried.

There resulted a toner comprised of 80.7 percent by weight of the above bio-based amorphous polyester resin, 6.8 percent of the above crystalline polyester resin, 3.5 percent of the above cyan pigment, and 9 percent of the above polyethylene wax, based on the total solids.

EXAMPLE VI

A toner was prepared by forming a core of 6.8 percent of a crystalline polyester resin, 3.5 percent of cyan pigment, 9 percent wax, and 52.6 percent of a bio-based amorphous resin, and then aggregated onto the core an additional 28 percent of the bio-based amorphous polyester resin to form a shell.

Into a 2 liter glass reactor equipped with an overhead mixer were added 84.9 grams of the bio-based amorphous polyester resin emulsion of Example II, 13.81 grams of the crystalline polyester resin emulsion of Example IV, and 24.38 grams of the cyan pigment PB15:3 (17.21 weight percent). There were then added 21.58 grams of a polyethylene wax aqueous dispersion (30 percent by weight) which was generated using P725 polyethylene wax available from Baker-Petrolite with a weight average molecular weight of 725 grams/mole, a melting point of 104° C., and 2 percent by weight of sodium dodecylbenzenesulfonate surfactant, and wherein the particle size of the aqueous dispersion particles were 200 nanometers.

Separately, 0.75 gram of $Al_2(SO_4)_3$ (27.85 weight percent) was added to the above mixture as the flocculent together with homogenization. The resulting mixture was then heated to 32.8° C. to aggregate the particles while stirring at 300 rpm. The particle size was monitored with a Coulter Counter until the core reached a volume average particle size of 4.45 microns with a GSD volume of 1.24, and then 46.9 grams of the bio-based amorphous resin emulsion of Example I were added as a shell material, resulting in core-shell structured particles with an average particle size of 5.44 microns, and GSD volume of 1.22.

Thereafter, the pH of the obtained reaction slurry was increased to 7.98 by adding 4 weight percent of a NaOH solution, followed by the addition of 2.69 grams of EDTA (39 weight percent) to freeze the toner growth. After freezing, the reaction mixture was heated to 80.1° C., and the pH was reduced to 7.46 by adding an acetic acid/sodium acetate (HAc/NaAc) buffer solution (pH 5.6) for coalescence. The toner resulting was quenched into water after coalescence, resulting in a final particle size of 6.18 microns, a GSD volume of 1.25, and GSD number 1.23. The toner slurry was then cooled to room temperature, separated by sieving (25 millimeters), filtration, followed by washing and freeze dried.

There resulted a toner comprised of 80.7 percent by weight of the bio-based amorphous polyester resin, 6.8 percent of the crystalline polyester resin, 3.5 percent of cyan pigment, and 9 percent by weight of polyethylene wax.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A process consisting of the reaction of a rosin acid with a glycerine carbonate compound in the presence of a catalyst resulting in a rosin-diol, wherein said rosin diol is reacted with a dicarboxylic acid and an organic diol and wherein the catalyst is tetraethyl ammonium iodide selected in an amount of from about 0.01 to about 0.8 mole percent.

2. A process in accordance with claim 1 wherein the rosin acid is selected from the group consisting of abietic acid, palustric acid, dehydroabietic acid, neo-abietic acid, levo-pimaric acid, pimaric acid, sandaracopimaric acid, iso-pimaric acid, hydrogenated abietic acid, hydrogenated palustric acid, hydrogenated dehydroabietic acid, hydrogenated neo-abietic acid, hydrogenated levo-pimaric acid, hydrogenated pimaric acid, hydrogenated sandaracopimaric acid, hydrogenated iso-pimaric acid, tetrahydro abietic acid, disproportionated rosin acid, and hydrogenated rosin acid.

3. A process in accordance with claim 1 wherein the rosin acid is selected from the group consisting of a disproportionated rosin acid, a dehydroabietic acid containing rosin acid, and a hydrogenated rosin acid.

4. A process in accordance with claim 1 wherein the glycerine carbonate is selected from the group consisting of glycerine carbonate, glycerol carbonate, glyceryl carbonate, and 4-hydroxymethyl-1,3-dioxolan-2-one.

5. A process in accordance with claim 1 wherein there results a mixture of a rosin diol and a bis-rosin glycerate, and wherein the product resulting is comprised of from about 60 to about 100 weight percent of rosin diol and said bis-rosin glycerate is present in an amount of from about 1 to about 40 weight percent with the total thereof being about 100 percent.

6. A process in accordance with claim 1 wherein said rosin acid, said glycerine carbonate, which glycerine carbonate is a bio-based glycerine carbonate, and said catalyst are heated at a temperature of from about 110° C. to about 190° C., and wherein the resulting product has an acid value of from about 0 to about 20 milligrams KOH/gram.

7. A process in accordance with claim 1 wherein said glycerine carbonate is derived from vegetable oils.

8. A process in accordance with claim 5 wherein said bis-rosin glycerate is selected from the group consisting of bis-abietic glycerate, bis-palustric glycerate, bis-dehydroabietic glycerate, bis-neo-abietic glycerate, bislevo-pimaric glycerate, bis-pimaric glycerate, bis-sandaracopimaric glycerate, bis-iso-pimaric glycerate, hydrogenated bis-abietic glycerate, hydrogenated bis-palustric glycerate, hydrogenated bis-dehydroabietic glycerate, bis-hydrogenated neo-abietic glycerate, hydrogenated bis-levo-pimaric glycerate, hydrogenated bis-pimaric glycerate, hydrogenated bis-sandaracopimaric glycerate, hydrogenated bis-iso-pimaric glycerate, bis-tetrahydroabietic glycerate, disproportionated bis-rosin glycerate, and hydrogenated bis-rosin glycerate.

9. A process in accordance with claim 5 wherein said rosin diol is represented by at least one of the following formulas/structures

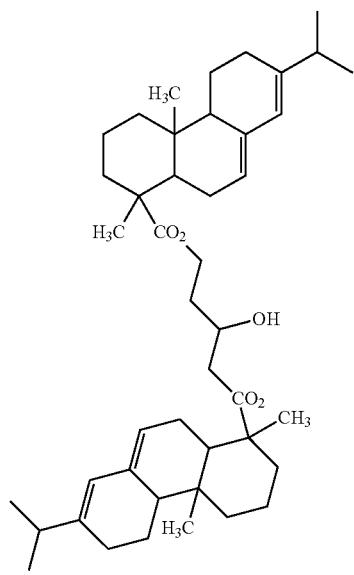

Bis-Abietic
Glycerate

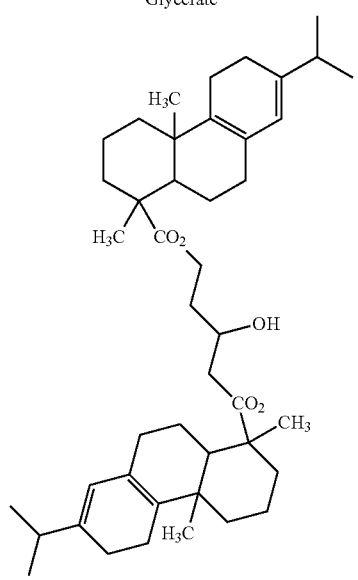

Bis-Palustric
Glycerate

-continued

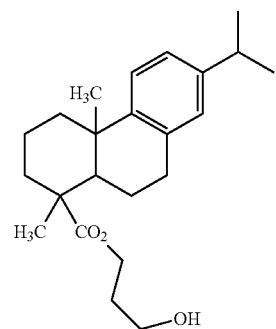

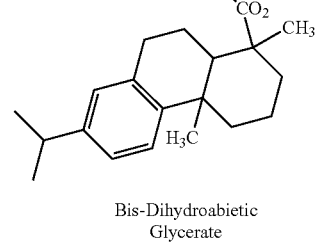

Bis-Dihydroabietic
Glycerate

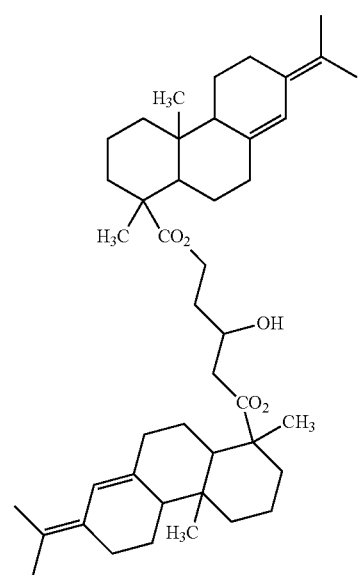

Bis-NeoAbietic
Glycerate

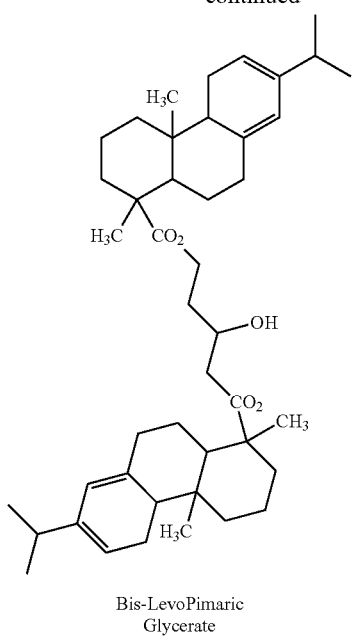
Bis-LevoPimaric Glycerate
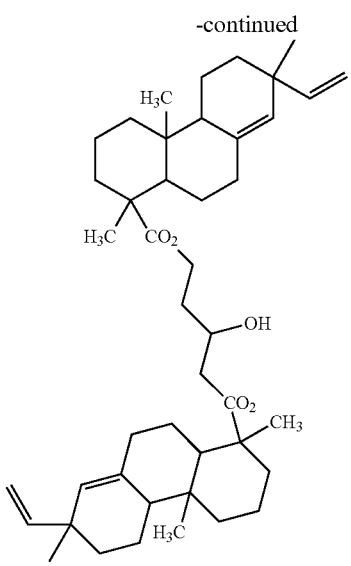
Bis-Sandaracopimaric Glycerate
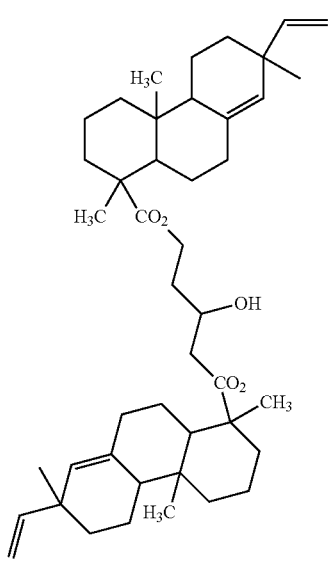
Bis-Pimaric Glycerate
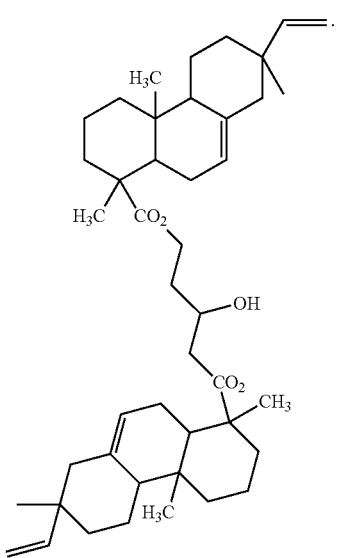
Bis-IsoPimaric Glycerate

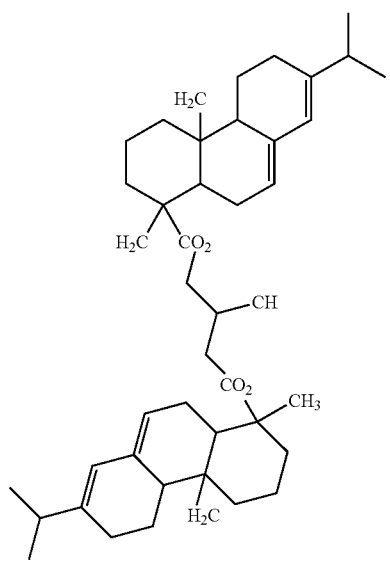
Bis-Abietic Glycerate
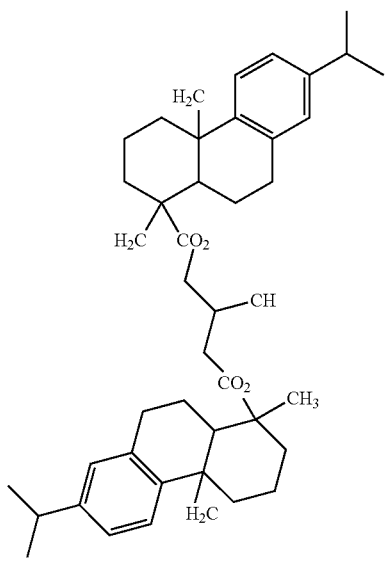
Bis-Dehydroabietic Glycerate
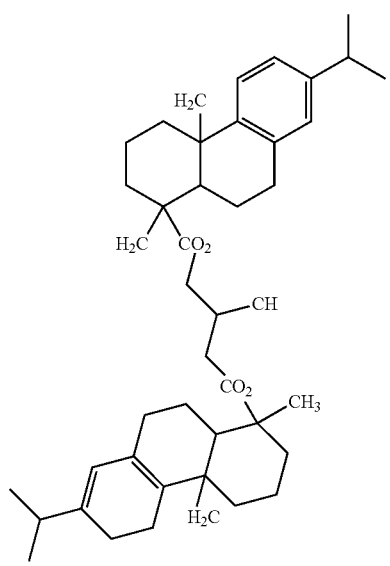
Bis-Palustric Glycerate
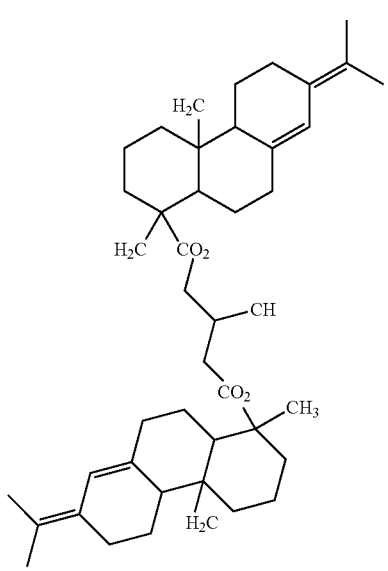
Bis-NeoAbietic Glycerate -continued

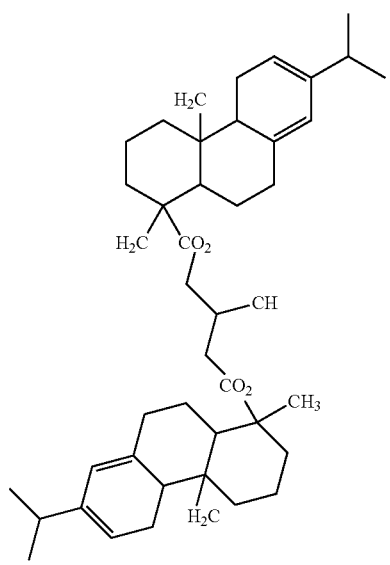

Bis-LevoPimaric
Glycerate

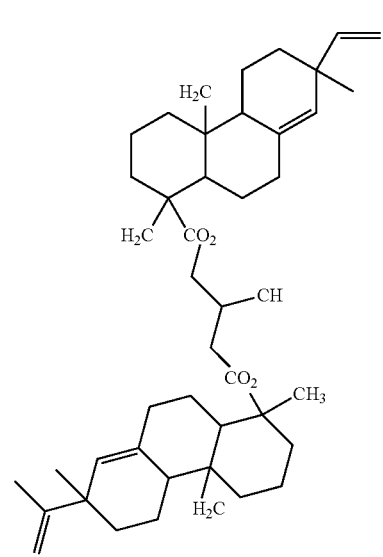

Bis-Pimaric
Glycerate

-continued

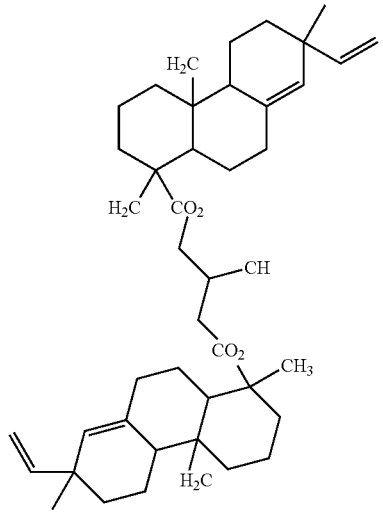

Bis-Sandaracopimaric
Glycerate

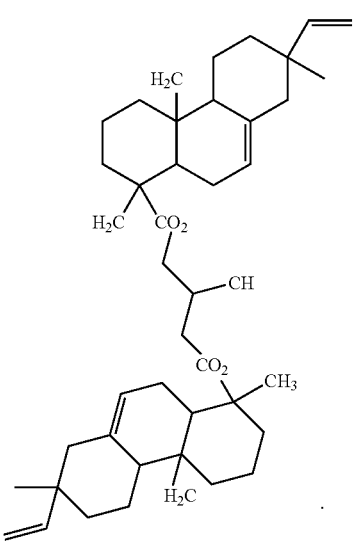

Bis-IsoPimaric
Glycerate

10. A process in accordance with claim 5 wherein said mixture of said rosin-diol and said bis-rosin glycerate product has a softening point of from about 60° C. to about 120° C.

11. A process in accordance with claim 1 wherein said rosin-diol is selected from the group consisting of abietic-diol, palustric-diol, dehydroabietic-diol, neo-abietic-diol, levo-pimaric-diol, pimaric-diol, sandaracopimaric-diol, iso-pimaric-diol, hydrogenated abietic-diol, hydrogenated palustric-diol, hydrogenated dehydroabietic-diol, hydrogenated neo-abietic-diol, hydrogenated levo-pimaric-diol, hydrogenated pimaric-diol, hydrogenated sandaracopimaric-diol, hydrogenated iso-pimaric-diol, tetrahydro abietic-diol, disproportionated rosin-diol, and hydrogenated rosin-diol.

12. A process in accordance with claim 1 wherein said rosin diol is represented by at least one of the following formulas/structures

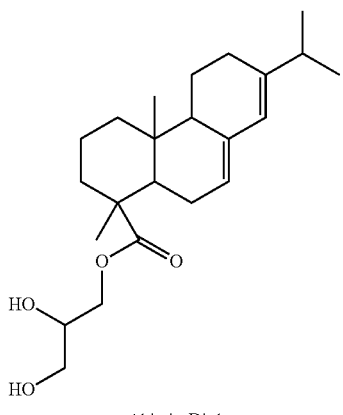
Abietic-Diol
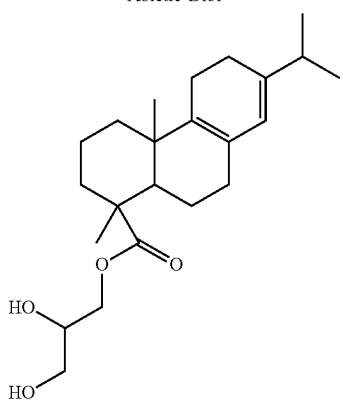
Palustric-Diol
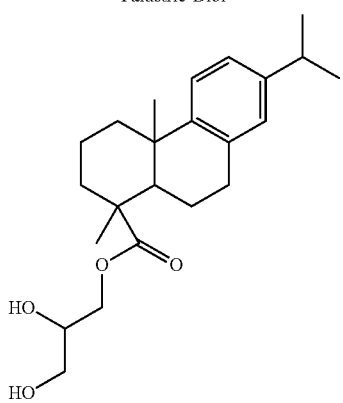
Dehydroabietic-Diol
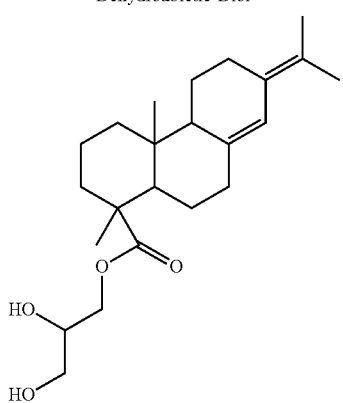
Neo-Abietic-Diol
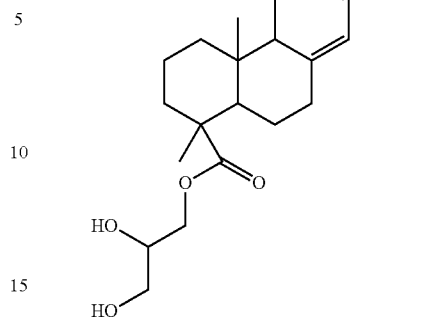
Levo-Pimaric-Diol
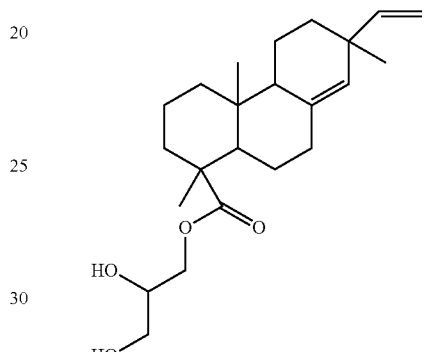
Pimaric-Diol
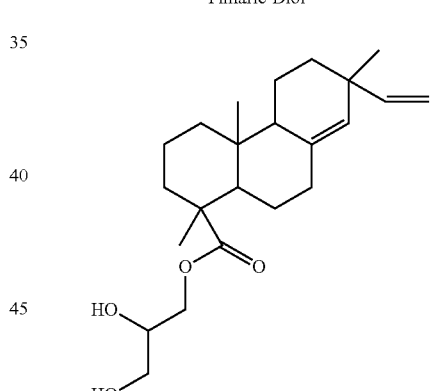
Sandaracopimaric-Diol
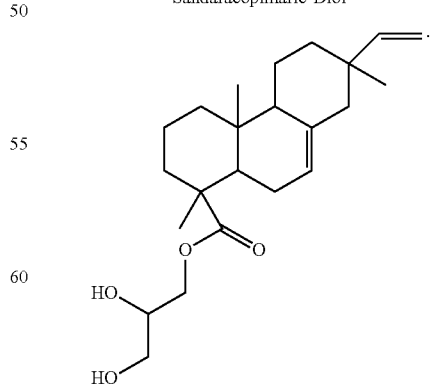
Iso-Pimaric-Diol

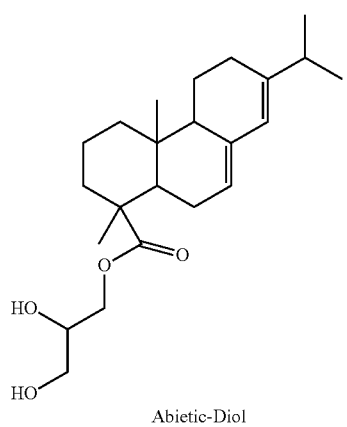
Abietic-Diol
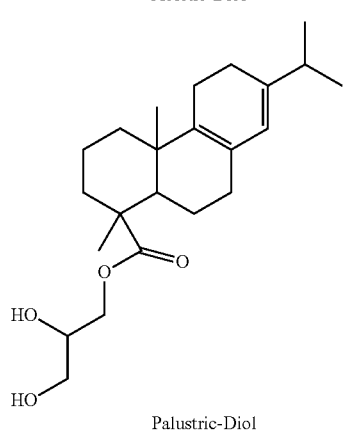
Palustric-Diol
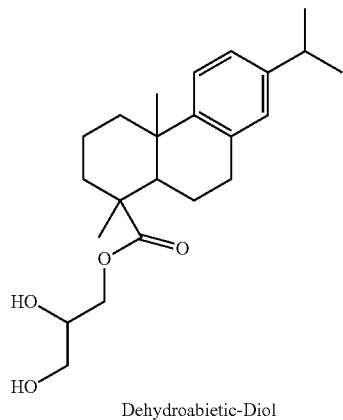
Dehydroabietic-Diol
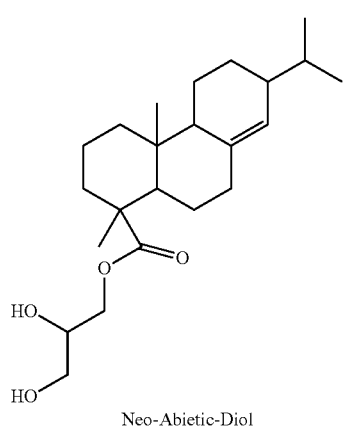
Neo-Abietic-Diol
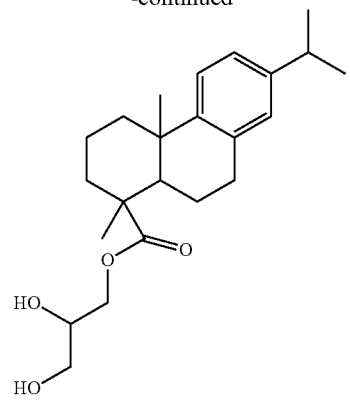
Levo-Pimaric-Diol
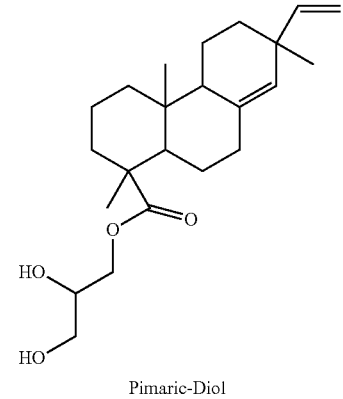
Pimaric-Diol
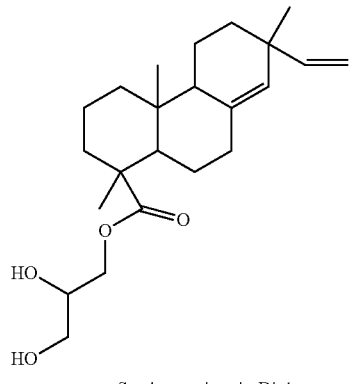
Sandaracopimaric-Diol
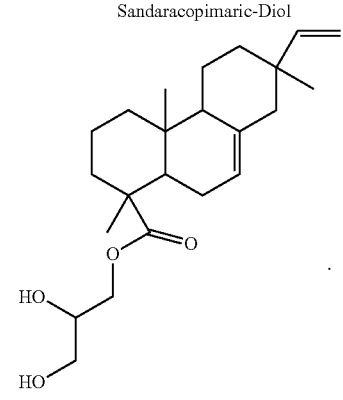
Iso-Pimaric-Diol
13. A process in accordance with claim 1 wherein said rosin diol is hydrogenated, and is represented by at least one of the following formulas/structures

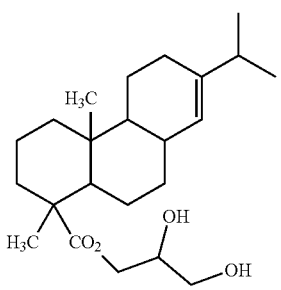
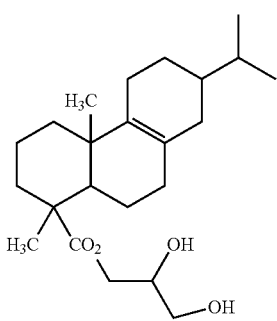
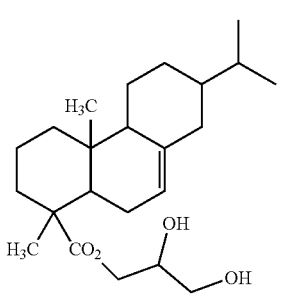
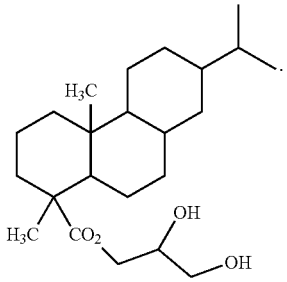

14. A process in accordance with claim 1 wherein said dicarboxylic acid is represented by the following formula/structure HOOC—(CH$_2$)n-COOH where n represents the number of groups of from about 1 to about 25 or

HOOC—R—COON where R is alkyl, alkenyl, alkynyl, or aryl.

15. A process in accordance with claim 1 wherein said dicarboxylic acid is selected from the group consisting of a dicarboxylic acid, an acetonedicarboxylic acid, an acetylenedicarboxylic acid, an adipic acid, an acetonedicarboxylic acid, an aspartic acid, fumaric acid, folic acid, azelaic acid, diglycolic acid, isophthalic acid, itaconic acid, glutaconic acid, glutamic acid, maleic acid, malic acid, malonic acid, oxalic acid, phthalic acid, pimelic acid, methylmalonic acid, pamoic acid, sebacic acid, suberic acid, succinic acid, tartaric acid, tartronic acid, terephthalic acid, alpha-hydroxyglutaric acid, dodecanedioic acid, dodecylsuccinic anhydride, dodecylsuccinic, and which diacid is optionally present in an amount of from about 40 to about 60 mole percent.

16. A process in accordance with claim 1 wherein said organic diol is selected from the group consisting of alkylene glycols, propoxylated bisphenol A, ethoxylated bisphenol A, 1,4-cyclohexanedimethanol, hydrogenated bisphenol A, and mixtures thereof.

17. A process consisting of the reaction of a rosin acid with a glycerine carbonate compound in the presence of a catalyst and wherein the catalyst is tetraethyl ammonium iodide selected in an amount of from about 0.01 to about 0.8 mole percent.

18. A process for the preparation of a bio-based amorphous polyester comprising the reaction of a rosin acid with a bio-based glycerine carbonate in the presence of a catalyst, followed by the reaction of the resulting rosin diol with a dicarboxylic acid and an optional organic diol, and wherein the bio content of said bio-based amorphous polyester is from about 45 to about 75 percent by weight of the bio-based amorphous polyester resin and wherein the catalyst is a tetraethyl ammonium iodide selected in an amount of from about 0.01 to about 0.8 mole percent.

19. A process in accordance with claim 18 wherein there results from said reaction a product comprised of a bio-based amorphous polyester resin, and wherein said resin comprises from about 30 to about 75 percent by weight of a bio-degradable component.

20. A process in accordance with claim 1 wherein the rosin acid is selected in an amount of from about 0.9 to 1.5 mole percent, and the bio-based glycerine carbonate is selected in an amount from about 0.9 to about 1.2 mole percent.

* * * * *